(12) United States Patent
Honda et al.

(10) Patent No.: US 12,025,569 B2
(45) Date of Patent: Jul. 2, 2024

(54) DEFECT INSPECTION DEVICE AND INSPECTION METHOD, AND OPTICAL MODULE

(71) Applicant: Hitachi High-Tech Corporation, Tokyo (JP)

(72) Inventors: Toshifumi Honda, Tokyo (JP); Shunichi Matsumoto, Tokyo (JP); Eiji Arima, Tokyo (JP); Yuta Urano, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 413 days.

(21) Appl. No.: 17/417,155

(22) PCT Filed: Dec. 27, 2018

(86) PCT No.: PCT/JP2018/048042
§ 371 (c)(1),
(2) Date: Jun. 22, 2021

(87) PCT Pub. No.: WO2020/136785
PCT Pub. Date: Jul. 2, 2020

(65) Prior Publication Data
US 2022/0074868 A1    Mar. 10, 2022

(51) Int. Cl.
*G01N 21/95* (2006.01)
*G01N 21/47* (2006.01)
*G01N 21/88* (2006.01)

(52) U.S. Cl.
CPC ......... *G01N 21/9501* (2013.01); *G01N 21/47* (2013.01); *G01N 21/8806* (2013.01); *G01N 2201/06113* (2013.01)

(58) Field of Classification Search
CPC .. G01N 21/956; G01N 21/9501; G01N 21/21; G01N 21/8806; G01N 2021/8848;
(Continued)

(56) References Cited

U.S. PATENT DOCUMENTS

| 6,018,391 A | 1/2000 | Yoshida |
| 9,874,526 B2 | 1/2018 | Liu et al. |

(Continued)

FOREIGN PATENT DOCUMENTS

| JP | H05256795 A | 10/1993 |
| JP | H10274621 A | 10/1998 |

(Continued)

OTHER PUBLICATIONS

Shojiro Kawakami et al. "Fabrication of 3D Photonic Crystals by Autocloning and Its Applications", IEICE Journal C vol. J81-C2 No. 10 pp. 787-795, Publication date: Oct. 25, 1998.

(Continued)

*Primary Examiner* — Michael P Stafira
(74) *Attorney, Agent, or Firm* — Miles & Stockbridge, P.C.

(57) ABSTRACT

An inspection device includes an illumination optical system that irradiates a sample with light having a predetermined wavelength, a detection optical system that includes a photoelectric conversion unit, and a data processing unit that extracts positional information of a foreign substance or a defect on the sample. The light collection optical system includes a polarized light transmission control unit that changes transmission characteristics according to polarization characteristics of the collected reflected light or scattered light. The polarized light transmission control unit includes a birefringence phase difference control unit that causes a predetermined phase difference between a fast phase axis and a slow phase axis of the reflected light or scattered light according to the polarization characteristics of the reflected light or scattered light, and a polarized light transmission unit that selectively transmits light according to a polarization direction of output light of the birefringence phase difference control unit.

15 Claims, 15 Drawing Sheets

(58) Field of Classification Search
CPC ... G01N 21/95607; G01N 2201/06113; G01N 2021/95676; G01N 21/896; G01N 2021/9513; G01N 21/23; G01N 21/8851; G01N 21/88; G01N 21/95; G01N 2201/0683; G01N 21/8901; G01N 21/95623; G01N 21/958; G01N 2021/8908; G01N 2201/0636; G01N 2201/068; G01N 2021/8825; G01N 21/892; G01N 2201/0697; G01N 2201/10; G01N 2201/12; G01N 2021/1772; G01N 2021/479; G01N 2021/8477; G01N 2021/8816; G01N 2021/8845; G01N 2021/8887; G01N 21/55; G01N 21/8422; G01N 2201/0612; G01N 2201/0675; G01N 23/20; G01N 37/005; G01N 2021/216; G01N 2021/3144; G01N 2021/8967; G01N 21/17; G01N 21/19; G01N 21/255; G01N 21/31; G01N 21/3504; G01N 21/4795; G01N 21/61; G01N 21/95684; G01N 2201/067; G01N 2021/8835; G01N 2021/8924; G01N 2021/8925; G01N 2021/95638; G01N 21/89; G01N 21/94; G01N 15/082; G01N 2021/8829; G01N 2021/8861; G01N 2033/0096; G01N 21/211; G01N 21/47; G01N 21/86; G01N 21/8983; G01N 23/2273; G01N 29/04; G01N 29/043; G01N 29/0654; G01N 29/221; G01N 29/2418; G01N 30/7206; G01N 33/00; G01N 2021/1789; G01N 2021/217; G01N 2021/4792; G01N 2021/8854; G01N 21/3581; G01N 21/41; G01N 21/4133; G01N 21/85; G01N 21/93; G01N 2201/12707; G01N 2201/12715

See application file for complete search history.

(56) References Cited

U.S. PATENT DOCUMENTS

| | | | |
|---|---|---|---|
| 2011/0246400 A1 | 10/2011 | Li | |
| 2013/0010306 A1* | 1/2013 | Coene | G03F 7/70633 |
| | | | 356/508 |
| 2015/0055123 A1 | 2/2015 | Rotter et al. | |
| 2015/0146200 A1* | 5/2015 | Honda | G01N 21/8806 |
| | | | 356/237.5 |
| 2016/0033398 A1* | 2/2016 | Kim | H01L 23/544 |
| | | | 356/243.1 |
| 2016/0041092 A1* | 2/2016 | Urano | G01N 21/95623 |
| | | | 356/237.5 |
| 2020/0256804 A1 | 8/2020 | Honda et al. | |

FOREIGN PATENT DOCUMENTS

| | | | | |
|---|---|---|---|---|
| JP | H11211421 A | | 8/1999 | |
| JP | 2005062524 A | | 3/2005 | |
| JP | 2007033433 A | * | 2/2007 | ............. G01N 21/47 |
| JP | 2009180561 A | | 8/2009 | |
| JP | 2013231631 A | | 11/2013 | |
| JP | 2015180864 A | * | 10/2015 | ............. G01N 21/21 |
| JP | 2015184203 A | * | 10/2015 | ............. G01N 21/956 |
| JP | 6117305 B2 | * | 4/2017 | ......... G01N 21/4795 |
| KR | 20130060351 A | * | 6/2013 | |
| WO | WO-2012060057 A1 | * | 5/2012 | ......... G01N 21/4795 |
| WO | WO-2013161912 A1 | * | 10/2013 | ............. G01J 1/0474 |
| WO | WO-2015151557 A1 | * | 10/2015 | ......... G01N 21/4738 |
| WO | 2018216277 A1 | | 11/2018 | |
| WO | WO-2018216277 A1 | * | 11/2018 | ............. G01N 21/47 |

OTHER PUBLICATIONS

Search Report dated Mar. 26, 2019 in International Application No. PCT/JP2018/048042.

Written Opinion dated Mar. 26, 2019 in International Application No. PCT/JP2018/048042.

* cited by examiner

DEFECT INSPECTION DEVICE AND INSPECTION METHOD, AND OPTICAL MODULE

TECHNICAL FIELD

The present invention relates to defect inspection method and inspection device, and an optical module for inspecting a minute defect present on a sample surface, determining a position, a type, and a size of the defect, and outputting a determination result.

BACKGROUND ART

In manufacturing lines of semiconductor substrates, thin film substrates, and the like, defects present on surfaces of the semiconductor substrates, the thin film substrates, and the like are inspected in order to maintain and improve a yield of products. As related art of the defect inspection, for example, techniques described in U.S. Pat. No. 9,874,526 B (PTL 1) and JP 2013-231631 A (PTL 2) have been known.

PTL 1 discloses an inspection system that includes one or more polarizing elements in an illumination optical system and includes an adjustable aperture, a rotatable wave plate, and a rotatable analyzer in a detection system. Although scattered light from a minute defect is maximized by illumination of P-polarized light, since the amount of scattered light from a sample surface is also maximized by P-polarized light, it is stated that a signal to noise ratio (SNR: S/N ratio) is maximized by shifting illumination polarization from the P-polarized light.

PTL 2 describes a defect inspection device that includes irradiation means for irradiating a linear region on a surface of a sample with illumination light, detection means for detecting reflected or scattered light from the linear region irradiated with light on the sample by the irradiation means, and signal processing means for detecting a defect on the sample by processing a signal obtained by detecting the reflected or scattered light. The detection means includes an optical system that forms an image in a direction perpendicular to one direction by dispersing the light reflected or scattered from the sample in one direction, and an optical system that has a line sensor in which detection pixels are two-dimensionally arranged, detects the reflected or scattered light dispersed in the one direction and formed in the direction perpendicular to the one direction by the optical system, adds output signals of the detection pixels arranged in the direction in which the reflected or scattered light is dispersed, and outputs an addition result.

NPL 1 describes the application of an optical device using a three-dimensional photonic crystal formed by a self-cloning technique.

CITATION LIST

Patent Literature

PTL 1: U.S. Pat. No. 9,874,526 B
PTL 2: JP 2013-231631 A

Non-Patent Literature

NPL 1: Shojiro Kawakami and 7 others "Fabrication of 3D Photonic Crystals by Autocloning and Its Applications", IEICE Journal C Vol. J81-C2 No. 10 pp. 787-795, Publication date: 1998 Oct. 25

SUMMARY OF INVENTION

Technical Problem

In the defect inspection used in the manufacturing process of the semiconductors and the like, it is necessary to inspect a minute defect, it is necessary to measure dimensions of the detected defect with high accuracy, it is necessary to non-destructively inspect the sample (for example, without altering the sample), it is necessary to obtain substantially constant inspection results for, for example, the number, position, dimension, and defect type of the detected defect when the same sample is inspected, and it is necessary to inspect a large number of the samples within a fixed time. In order to improve defect detection sensitivity by using an optical method, it is necessary to relatively increase the scattered light from the defect due to the illumination on the sample surface with respect to the scattered light from the sample surface.

In the technique described in PTL 1, a linear polarizer and a ¼ wave plate are applied in order to improve an inspection SNR by detecting the scattered light from the defect and the scattered light from the sample surface under a condition in which the polarized light rays thereof are as orthogonal as possible and controlling the polarized light rays. However, in this combination, when the scattered light from the sample surface contains an elliptically polarized light component, there is a problem that the scattered light from the defect and the scattered light from the sample surface are not sufficiently separated by the polarizer.

In the method of PTL 1, a phase difference between a fast phase angle and a slow phase angle is shifted by ¼ of the wavelength by using the rotatable ¼ wave plate for the light collected by the detection system, and thus, specific elliptically polarized light can be converted into linearly polarized light. However, the light rays used as a target here are the scattered light from the defect and the scattered light from the sample surface, and polarization directions thereof are different from each other. In the ¼ wave plate, since a direction of the linearly polarized light to be incident changes the polarized light to circularly polarized light under a condition in which the fast phase angle or the slow phase angle of the wave plate are shifted by 45 degrees, when the incident light is the polarized light approximated to the linearly polarized light, this elliptically polarized light cannot be converted into the linearly polarized light unless an angle between a long axis direction of this ellipse and a fast phase axis or a slow phase axis of the ¼ wave plate is small.

However, in general, the polarization directions of the scattered light from the defect and the scattered light from the sample surface do not coincide with each other. In the inspection by the P-polarized light incident on the sample surface used to maximize the scattered light from minute defect, since the scattered light rays from the defect and the sample surface are not significantly shifted from the linearly polarized light and the two polarization directions are often significantly different, even though there is an attempt to convert the light from the sample surface into the linearly polarized light by the ¼ wave plate, there is a side effect that one of the scattered light rays is shifted from the linearly polarized light, and it is difficult to improve sensitivity. In the inspection by the illumination of the P-polarized light which is generally used to detect the defect smaller than the wavelength, it is common to compromise polarization separation and apply only a ½ wave plate.

PTL 2 does not describe that weak scattered light from the minute defect can be detected in a state in which shot noise due to scattering on the sample surface by changing transmission characteristics of a polarized light transmission unit according to polarization characteristics of the light collected by the detection optical system and relatively increasing intensity of the scattered light from the defect with respect to the scattered light from the sample surface.

The present invention has been made in order to solve the above-mentioned problems of the related art, and provides a defect inspection device, a defect inspection method, and an optical module capable of achieving high-speed and high-sensitivity defect detection by increasing transmittance of scattered light from a defect while reducing transmission of scattered light from a sample surface in a polarized light transmission unit with respect to light collected by a detection optical system and relatively increasing strength of the scattered light from the defect with respect to the scattered light from the sample surface.

Solution to Problem

In order to solve the above problems, in the present invention, an inspection device includes a sample holding unit that holds a sample to be inspected, an illumination optical system that irradiates the sample held by the sample holding unit with light having a predetermined wavelength, a detection optical system that includes a photoelectric conversion unit, collects reflected light or scattered light from the sample irradiated with the light, and guides the collected reflected or scattered light to the photoelectric conversion unit, and a data processing unit that extracts positional information of a foreign substance or a defect on the sample by processing an output signal from the photoelectric conversion unit that detects the reflected light or scattered light. The detection optical system includes a polarized light transmission control unit that changes transmission characteristics according to polarization characteristics of the collected reflected light or scattered light, and the polarized light transmission control unit includes a birefringence phase difference control unit that causes a predetermined phase difference due to birefringence between a fast phase axis and a slow phase axis of the reflected light or scattered light according to the polarization characteristics of the reflected light or scattered light collected by the detection optical system, and a polarized light transmission unit that selectively transmits light according to a polarization direction of output light of the birefringence phase difference control unit.

In order to solve the above problems, in the present invention, an inspection method includes irradiating a sample held by a sample holding unit that holds a sample to be inspected with light having a predetermined wavelength from an illumination optical system, collecting, by a detection optical system, reflected light or scattered light from the sample irradiated with the light by the illumination optical system, and detecting, by a photoelectric conversion unit, the collected reflected or scattered light, and extracting positional information of a foreign substance or a defect on the sample by, by a data processing unit, processing an output signal of the photoelectric conversion unit that detects the reflected light or scattered light. The method further includes causing, by a birefringence phase difference control unit, a predetermined phase difference due to birefringence between a fast phase axis and a slow phase axis of the reflected light or scattered light according to polarization characteristics of the reflected light or scattered light collected by the detection optical system, transmitting, by a polarized light transmission unit, selectively light according to a polarization direction of the reflected light or scattered light in which the predetermined phase difference is caused by the birefringence phase difference control unit, and detecting, by the photoelectric conversion unit, the light selectively transmitted by the polarized light transmission unit.

In order to solve the above problems, in the present invention, an optical module is constituted by an objective lens, a polarized light transmission control unit that changes transmission characteristics according to polarization characteristics of light collected by the objective lens, an imaging lens, and a sensor. The polarized light transmission control unit includes a birefringence phase difference control unit that causes a predetermined phase difference due to birefringence between a fast phase axis and a slow phase axis of light having the polarization characteristics collected by the objective lens, and a polarized light transmission unit that selectively transmits output light of the birefringence phase difference control unit according to a polarization direction of the output light.

Advantageous Effects of Invention

According to the present invention, the polarized light transmission element typically sets a phase difference of a non-integer multiple of 90 degrees between the fast phase axis and the slow phase axis for the light rays collected by the detection optical systems, the transmission of the scattered light from the sample surface in the polarized light transmission unit is decreased, whereas the transmittance of the scattered light from the defect is increased. Accordingly, the intensity of the scattered light from the defect is set to be relatively stronger than the scattered light from the sample surface, and thus, high-speed and high-sensitivity defect detection is achieved. Other objects, configurations, and effects will be made apparent in the following descriptions.

DESCRIPTION OF EMBODIMENTS

Hereinafter, embodiments of the present invention will be described with reference to the drawings. The present invention is not limited to the embodiments to be described below, and includes various modification examples. For example, the embodiments to be described below are described in detail in order to facilitate easy understanding of the present invention, and are not limited to necessarily include the entire described configuration. A part of the configuration of a certain embodiment can be substituted into another embodiment, and another embodiment can be added to the configuration of a certain embodiment. In addition, the configuration of another embodiment can be added, removed, and substituted to, from, and into a part of the configuration of the aforementioned embodiments.

In the following embodiments, a case where the present invention is applied to an inspection device used for defect inspection executed in a process of manufacturing a semiconductor or the like will be described. (1) Detection of minute defects, (2) high-precision measurement of dimensions of the detected defects, (3) acquisition of substantially constant inspection results related to the number, position, dimensions, and defect type of the detected defects, and (4) inspection of a large number of samples within a fixed time can be achieved by using the inspection device.

First Embodiment

Figure 1A:
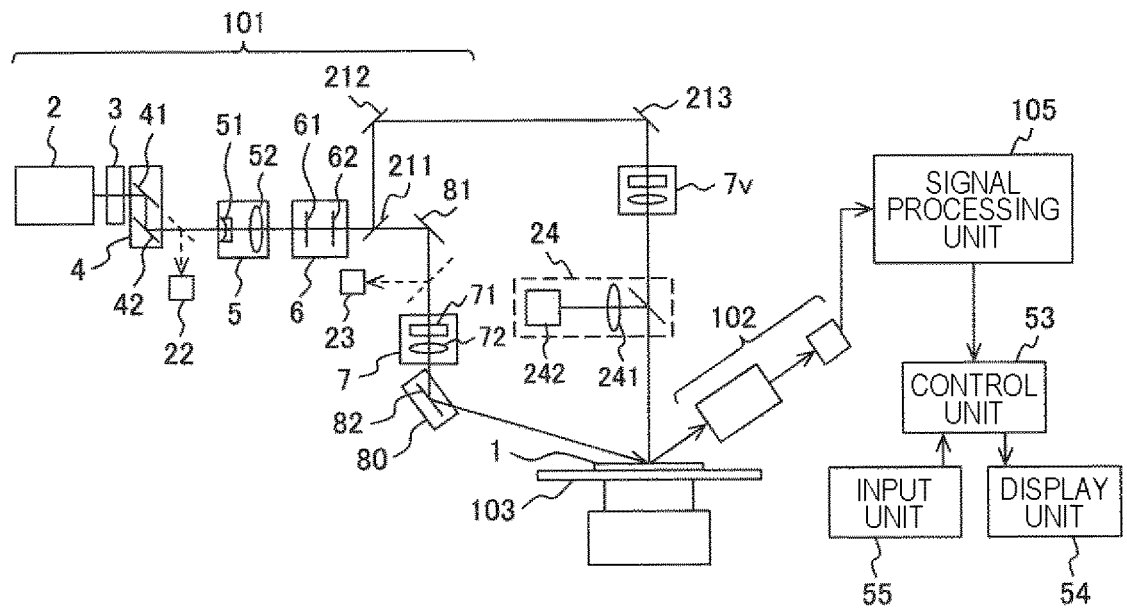
FIG. 1A is a block diagram showing an overall schematic configuration showing a practical example of a defect inspection device according to a first embodiment of the present invention.

FIG. 1A is an example of a schematic configuration diagram of a defect inspection device according to the present embodiment. The defect inspection device includes an illumination unit 101, a detection unit 102, a stage 103 on which a wafer as a sample 1 can be mounted, a signal processing unit 105, a control unit 53, a display unit 54, and an input unit 55. The illumination unit 101 appropriately includes a laser beam source 2, an attenuator 3, an emission light adjustment unit 4, a beam expander 5, a polarized light control unit 6, and an illumination intensity distribution control unit 7.

A laser beam emitted from the laser beam source 2 is adjusted to a desired beam intensity by the attenuator 3, is adjusted to a desired beam position and a beam traveling direction by the emission light adjustment unit 4, is adjusted to a desired beam diameter by the beam expander 5, is adjusted to a desired polarization state by the polarized light control unit 6, is adjusted to a desired intensity distribution by the illumination intensity distribution control unit 7, and is illuminated to an inspection target region of the sample (wafer) 1.

An incidence angle of illumination light on a surface of the sample 1 (an inclination angle of the sample surface with respect to a normal direction) is decided by positions and angles of reflection mirrors 81 and 82 arranged in an optical path of the illumination unit 101. The incidence angle of the illumination light is set to an angle suitable for detecting minute defects. A reference sign 80 denotes an adjusting mechanism for adjusting the angle of the reflection mirror 82. As an illumination incidence angle becomes larger, that is, an illumination elevation angle (an angle formed by the sample surface and an illumination optical axis) becomes smaller, scattered light (called haze) from minute irregularities of the surface of the sample 1 that becomes noise becomes weaker with respect to scattered light from minute foreign substances on the surface of the sample 1. Thus, the incidence angle of the illumination light is suitable for detecting the minute defect. Thus, when the scattered light from the minute irregularities on the surface of the sample 1 hinders the detection of the minute defects, the incidence angle of the illumination light may be preferably set to 75 degrees or more (elevation angle of 15 degrees or less).

On the other hand, in oblique incident illumination, as the illumination incidence angle becomes smaller, an absolute amount of scattered light from the minute foreign substances becomes larger. Thus, when the insufficient amount of scattered light from the defects hinders the detection of the minute defects, the incidence angle of the illumination light may be preferably set to 60 degrees or more and 75 degrees or less (elevation angle of 15 degrees or more and 30 degrees or less).

When the oblique incident illumination is performed, polarized light of the illumination is rendered into P-polarized light by polarization control in the polarized light control unit 6 of the illumination unit 101, and thus, the scattered light from the defects on the surface of the sample 1 further increases as compared with other pieces of polarized light. When the scattered light from the minute irregularities on the surface of the sample 1 hinders the detection of the minute defects, the polarized light of the illumination is rendered into S-polarized light, and thus, the scattered light from the minute irregularities on the surface of the sample 1 decreases. The polarized light of the illumination can be set to light polarized at 45 degrees which is between P and S or circularly polarized light.

As shown in FIG. 1A, if necessary, an illumination optical path is changed by inserting a mirror 211 into the optical path of the illumination unit 101 by driving means (not shown), and the illumination light is reflected in sequence from mirrors 212 and 213 and irradiated in a direction substantially perpendicular to the sample surface (vertical illumination). At this time, an illumination intensity distribution on the surface of the sample 1 is controlled by an illumination intensity distribution control unit 7v in the same manner as the oblique incident illumination.

A beam splitter is inserted at the same position as the mirror 211, and the oblique incident illumination and the substantially vertical illumination are simultaneously performed on the surface of the sample 1. Thus, illumination suitable for obtaining scattered light from concave defects (polishing scratches and crystal defects in crystalline material) on the sample surface can be performed. An illumination intensity distribution monitor 24 shown in FIG. 1A will be described in detail later.

As the laser beam source 2, in order to detect the minute defects near the surface of the sample 1, an ultraviolet or vacuum ultraviolet laser beam with a short wavelength (wavelength of 355 nm or less) is oscillated as a wavelength that hardly penetrates to the inside of the sample 1, and a high power of 2 W or more is used. An emission beam diameter is about 1 mm. In order to detect the defects inside the sample 1, a wavelength that oscillates a visible or infrared laser beam is used as a wavelength that easily penetrates to the inside of the sample 1.

Figure 1B:
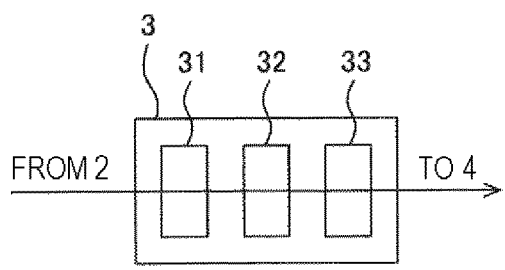
FIG. 1B is a diagram showing a practical example of the defect inspection device according to the first embodiment of the present invention, and is a block diagram showing an internal configuration of an attenuator 3 of FIG. 1A.

As shown in FIG. 1B, the attenuator 3 appropriately includes a first polarizing plate 31, a ½ wave plate 32 that can rotate around an optical axis of the illumination light, and a second polarizing plate 33. The light incident on the attenuator 3 is converted into linearly polarized light by the first polarizing plate 31, a polarization direction is rotated in any direction according to a slow phase axis azimuth angle of the ½ wave plate 32, and the polarized light passes through the second polarizing plate 33.

The azimuth angle of the ½ wave plate 32 is controlled, and thus, the light intensity is dimmed at any ratio. When a degree of linear polarization of the light incident on the attenuator 3 is sufficiently high, the first polarizing plate 31 is not always necessary. The attenuator 3 uses a pre-calibrated relationship between an input signal and a dimming rate. As the attenuator 3, an ND filter having a gradation density distribution can be used, or ND filters having a plurality of densities different from each other can be switched and used.

The emission light adjustment unit 4 includes a plurality of reflection mirrors 41 and 42. Here, an embodiment in a case where the emission light adjustment unit includes two reflection mirrors 41 and 42 will be described, but the present invention is not limited thereto, and three or more reflection mirrors may be appropriately used. Here, a three-dimensional Cartesian coordinate system (XYZ coordinates) is tentatively defined, and it is assumed that incident light on the reflection mirror 41 is traveling in a +X direction.

The reflection mirror 41 is installed so as to deflect the incident light in a +Y direction (incident and reflection in an XY plane), and the reflection mirror 42 is installed so as to deflect the light reflected by the reflection mirror 41 in a +Z direction (incident and reflection in a YZ plane). Each of the reflection mirrors 41 and 42 adjusts a parallel translation and a tilt angle by using a mechanism (not shown), and thus, a position and a traveling direction (angle) of the light emitted from the emission light adjustment unit 4 is adjusted.

As described above, incident and reflection surfaces (XY surface) of the reflection mirror 41 and the incident and reflection surfaces (YZ surface) of the reflection mirror 42 are arranged so as to be orthogonal, and thus, the position and angle adjustment of the light emitted from the emission light adjustment unit 4 in the XZ plane (traveling in the +Z direction) and the position and angle adjustment thereof in the YZ plane can be performed independently.

The beam expander 5 has two or more lens groups 51 and 52, and has a function of expanding a diameter of a pencil of light rays to be incident. For example, a Galileo-type beam expander having a combination of a concave lens and a convex lens is used. The beam expander 5 is installed on a translation stage having two or more axes (not shown), and a position can be adjusted such that a center coincides with a predetermined beam position. A tilt angle adjustment function for the entire beam expander 5 is provided such that an optical axis of the beam expander 5 and a predetermined beam optical axis coincide with each other.

A spacing between the lens groups 51 and 52 is adjusted, and thus, it is possible to control an expansion ratio of the diameter of the pencil of light rays (zoom mechanism). When the light incident on the beam expander 5 is not parallel, the expansion of the diameter of the pencil of light rays and collimating (achievement of quasi-parallel of the pencil of light rays) are simultaneously performed by adjusting the spacing between the lens groups 51 and 52. The collimating of the pencil of light rays may be performed by installing a collimating lens on an upstream side of the beam expander 5 independently of the beam expander 5. An expansion ratio of the beam diameter by the beam expander 5 is about 5 to 10 times, and a beam with a beam diameter of 1 mm emitted from the light source is expanded from 5 mm to 10 mm.

The polarized light control unit 6 is constituted by a ½ wave plate 61 and a ¼ wave plate 62, and controls the polarization state of the illumination light to any polarization state. States of the light incident on the beam expander 5 by a beam monitor 22 and the light incident on the illumination intensity distribution control unit 7 by a beam monitor 23 in the middle of the optical path of the illumination unit 101 (intensity and position of the laser beam on the optical axis) are measured.

FIGS. 2 to 6 show schematic diagrams of a positional relationship between an illumination optical axis 120 guided from the illumination unit 101 to the sample surface and an illumination intensity distribution shape. The configuration of the illumination unit 101 in FIGS. 2 to 5 is a part of the configuration of the illumination unit 101, and the emission light adjustment unit 4, the mirror 211, the beam monitors 22 and 23, and the like are omitted.

Figure 2:
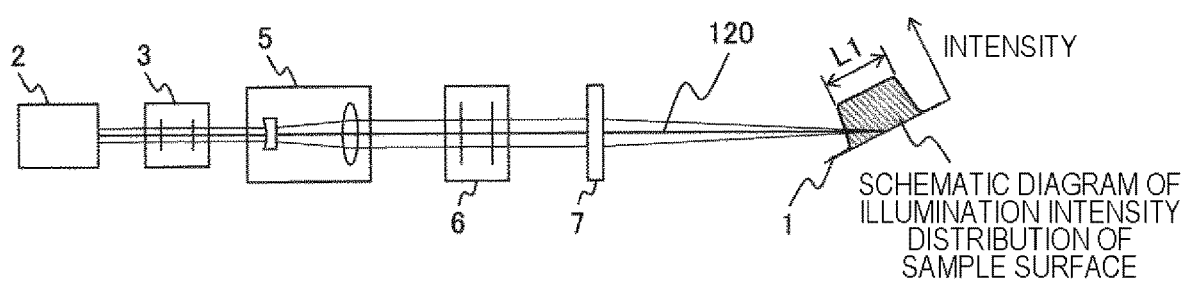
FIG. 2 is a block diagram showing a first example of an illumination intensity distribution shape achieved by an illumination unit according to the first embodiment of the present invention.

FIG. 2 shows a schematic diagram of a cross section of an incidence plane (a surface including the illumination optical axis and a normal of the surface of the sample 1) of the oblique incident illumination. The oblique incident illumination is inclined with respect to the surface of the sample 1 in the incidence plane. The illumination unit 101 creates a substantially uniform illumination intensity distribution in the incidence plane. As shown in the schematic diagram of the illumination intensity distribution on the right side of FIG. 2, a length of a portion L1 at which illumination intensity is uniform in a linearly illuminated region is 100 μm to 4 mm in order to inspect a large area per unit time.

Figure 3:
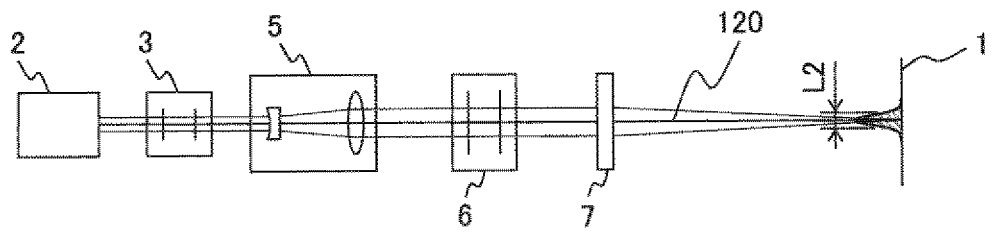
FIG. 3 is a block diagram showing a second example of an illumination intensity distribution shape achieved by the illumination unit according to the first embodiment of the present invention.

FIG. 3 shows a schematic diagram of a cross section of a surface including the normal of the surface of the sample 1 and perpendicular to the incidence plane of the oblique incident illumination. In this plane, the illumination intensity distribution on the surface of the sample 1 forms an illumination intensity distribution in which the intensity of a periphery is weaker than a center. More specifically, the illumination intensity distribution becomes a Gaussian distribution that reflects the intensity distribution of the light incident on the illumination intensity distribution control unit 7 or an intensity distribution similar to a Bessel function of the first kind of order 1 or a sinc function that reflects an opening shape of the illumination intensity distribution control unit 7.

Since a length of the illumination intensity distribution in this plane (a length of a region having an illumination intensity of 13.5% or more of a maximum illumination intensity) L2 is shorter than a length of a portion in the incidence plane at which the illumination intensity is uniform in order to reduce haze generated from the surface of the sample 1, and is about 2.5 μm to 20 μm. The illumination intensity distribution control unit 7 includes optical elements such as an aspherical lens, a diffractive optical element, a cylindrical lens array, and a light pipe. As shown in FIGS. 2 and 3, the optical elements constituting the illumination intensity distribution control unit 7 are installed perpendicular to the illumination optical axis 120.

Figure 4:
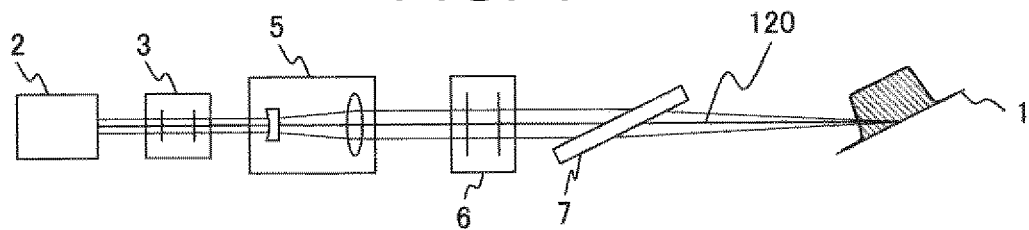
FIG. 4 is a block diagram showing a third example of the illumination intensity distribution shape achieved by the illumination unit according to the first embodiment of the present invention.
Figure 5:
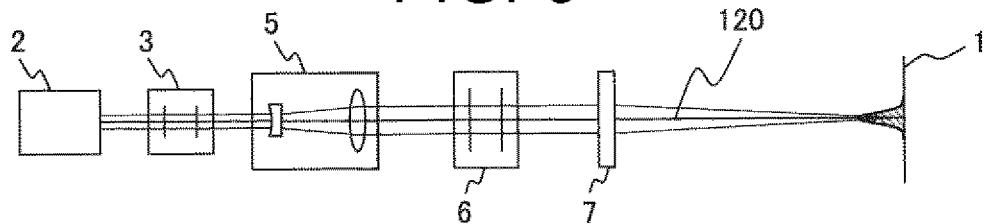
FIG. 5 is a block diagram showing a fourth example of the illumination intensity distribution shape achieved by the illumination unit according to the first embodiment of the present invention.

Configurations shown in FIGS. 4 and 5 show configurations when the inclination of the illumination optical axis 120 with respect to the surface of the sample 1 is changed in the configuration shown in FIGS. 2 and 3. That is, a state in which a linear illumination region on the sample 1 with respect to an incident direction of the illumination optical axis 120 on the surface of the sample 1 is changed by 90 degrees from the cases described with reference to FIGS. 2 and 3 is illustrated.

The configuration shown in FIG. 4 shows a schematic diagram of a cross section of the incidence plane (a surface including the illumination optical axis and the normal of the surface of the sample 1) of the oblique incident illumination. The oblique incident illumination is inclined with respect to the surface of the sample 1 in the incidence plane. In this plane, the illumination intensity distribution on the surface of the sample 1 forms an illumination intensity distribution in which the intensity of a periphery is weaker than a center. On the other hand, the configuration shown in FIG. 5 shows a schematic diagram of a cross section of a surface including the normal of the surface of the sample 1 and perpendicular to the incidence plane of the oblique incident illumination. A substantially uniform illumination intensity distribution is created in the incidence plane.

The illumination intensity distribution control unit 7 includes a spatial light phase modulation element 71 which is a type of a spatial light modulator (SLM) in a front stage, and an optical element 72 (for example, a diffractive optical element (DOE)) that acts on a phase distribution and an intensity distribution of light incident in a rear stage. The illumination intensity distribution control unit 7v also has a similar configuration.

In the configuration shown in FIG. 1, the state of the illumination light in the illumination unit 101 is measured by the beam monitor 22. The beam monitor 22 measures and outputs a position and an angle (traveling direction) of the illumination light passed through the emission light adjustment unit 4 or a position and a wavefront of the illumination light incident on the illumination intensity distribution control unit 7.

The position of the illumination light is measured by measuring a position of the center of gravity of the light intensity of the illumination light. As specific position measurement means, a position sensitive detector (PSD) or an image sensor such as a CCD sensor or a CMOS sensor is used. The angle of the illumination light is measured by the position sensitive detector or an image sensor installed at a position far from a light source from the position measurement means or at a condensing position by a collimating lens.

The illumination light position and the illumination light angle measured by the beam monitor 22 are input to the control unit 53 and are displayed on the display unit 54. When the illumination light position or angle is shifted from a predetermined position or angle, the emission light adjustment unit 4 adjusts the position so as to return to the predetermined position.

The wavefront measurement of the illumination light by the beam monitor 23 is performed to measure the parallelism of the light incident on the illumination intensity distribution control unit 7. Measurements are performed with a shearing interferometer or a Shack-Hartmann wavefront sensor.

The shearing interferometer measures a divergence or convergence state of the illumination light by a pattern of interferometric fringes observed when optical glass with a thickness of about several mm which is obtained by polishing both surfaces to be flat surfaces is obliquely inclined and inserted into the illumination optical path and reflected light from a front surface and reflected light from a back surface are projected onto a screen, and there is SPUV-25 manufactured by SIGMAKOKI Co., LTD. When an image sensor such as a CCD sensor or a CMOS sensor is installed at a screen position, it is possible to automatically measure the divergence or convergence state of the illumination light.

The Shack-Hartmann wavefront sensor divides the wavefront by a fine lens array, projects the divided wavefronts onto an image sensor such as a CCD sensor, and measures inclinations of the individual wavefronts from the displacement of the projection position. Compared with the shearing interferometer, it is possible to perform detailed wavefront measurement such as turbulence of a partial wavefront.

When it is found by the wavefront measurement that the light incident on the illumination intensity distribution control unit 7 is not the quasi-parallel light but is diverged or converged, the lens groups of the beam expander 5 in the front stage are displaced in an optical axis direction, and thus, the incident light can be approximated to the quasi-parallel light.

When it is found by the wavefront measurement using the beam monitor 23 that the wavefront of the light incident on the illumination intensity distribution control unit 7 is partially inclined, an appropriate phase difference is given for each position of the cross section of the pencil of light rays such that the wavefront becomes the flat surface by the spatial light phase modulation element 71 which is a type of spatial light modulator (SLM) inserted in the front stage of the illumination intensity distribution control unit 7, and thus, the wavefront can be approximated to the flat surface, that is, the illumination light can be approximated to the quasi-parallel light.

By wavefront accuracy measurement and adjustment means as described above, wavefront accuracy (shift from a predetermined wavefront (design value or initial state)) of the light incident on the illumination intensity distribution control unit 7 can be suppressed to $\lambda/10$ rms or less.

The illumination intensity distribution on the surface of the sample 1 adjusted by the illumination intensity distribution control unit 7 is measured by the illumination intensity distribution monitor 24 that detects the reflected light from the surface of the sample 1. As shown in FIG. 1, even when the vertical illumination is used, the illumination intensity distribution on the sample surface adjusted by the illumination intensity distribution control unit 7v is similarly measured by the illumination intensity distribution monitor 24. The illumination intensity distribution monitor 24 forms an image of the sample surface on an image sensor 242 such as a CCD sensor or a CMOS sensor via a lens 241 and detects the illumination intensity distribution as an image.

The image of the illumination intensity distribution detected by the illumination intensity distribution monitor 24 is processed by the control unit 53. A position of a center of gravity of the intensity, maximum intensity, a maximum intensity position, a width and a length of the illumination intensity distribution (a width and a length of an illumination intensity distribution region at which the illumination intensity distribution is equal to or more than predetermined intensity or is equal to or more than a predetermined ratio with respect to the maximum intensity), and the like are calculated, and the calculated results are displayed on the display unit 54 together with a contour shape, a cross-sectional waveform, and the like of the illumination intensity distribution.

Figure 6:
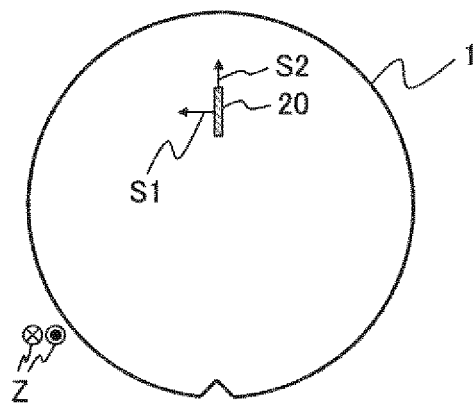
FIG. 6 is a plan view of a wafer showing a first example showing an illumination distribution shape and a scanning direction on a sample surface according to the first embodiment of the present invention.
Figure 7A:
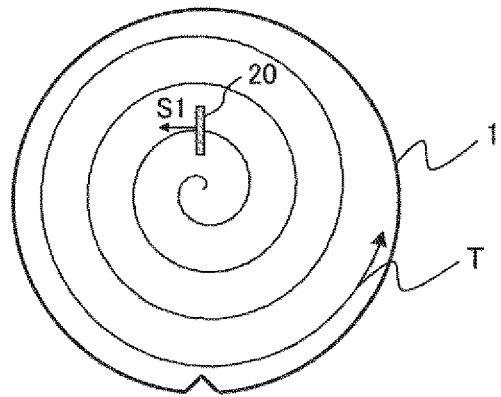
FIG. 7A is a plan view of a wafer showing a first example showing a locus of an illumination spot by scanning.

The illuminance distribution shape (illumination spot 20) formed on the surface of the sample 1 by the illumination unit 101 and a sample scanning method will be described with reference to FIGS. 6 and 7A. A circular semiconductor silicon wafer is assumed as the sample 1. The stage 103 includes a translation stage, a rotation stage, and a Z stage (all not shown) for adjusting a height of the sample surface.

As described above, it is assumed that the illumination spot 20 has a long illumination intensity distribution in one direction, a direction thereof is S2, and a direction substantially orthogonal to S2 is S1. The sample surface is scanned in a circumferential direction S1 of a circle with a rotation axis of the rotation stage as a center by rotational motion of the rotation stage and in a translational direction S2 of the translation stage by a translational motion of the translation stage. While the sample is rotated once by scanning the sample in the scanning direction S1, the sample is scanned by a distance equal to or less than a length in a longitudinal direction of the illumination spot 20 in the scanning direction S2, and thus, the illumination spot draws a spiral locus T on the sample 1. The entire surface of the sample 1 is scanned.

Figure 7B:
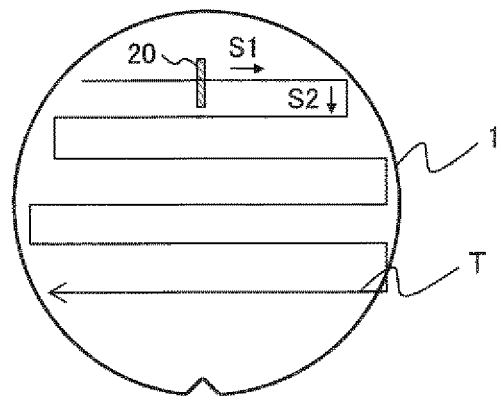
FIG. 7B is a plan view of a wafer showing a second example showing the locus of the illumination spot by scanning.

FIG. 7B shows the scanning of the illumination spot in a configuration with a two-axis translation stage instead of the rotation stage. The sample is scanned in the S1 direction, the sample surface is scanned at a constant speed in a strip shape with an illumination spot length in an illumination spot S1 direction. At the end of the sample 1, the entire surface of the sample 1 is scanned by repeatedly moving the translation stage in the S2 direction by a scanning width to move a field of view and scanning at a constant speed in a direction opposite to the S1 direction.

Figure 8A:
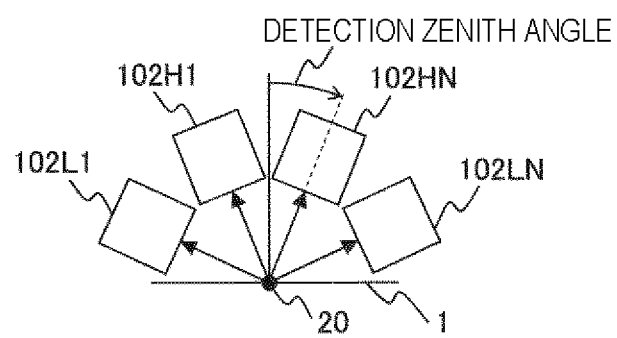
FIG. 8A is a side view of arrangement and a detection direction of a detection unit including a high angle detection unit and a low angle detection unit according to the first embodiment of the present invention as viewed from the side.

FIGS. 8A to 8D show an example of the arrangement of the detection unit 102. FIG. 8A is a side view showing a state in which a plurality of high angle detection units 102H1 to 102HN and low angle detection units 102L1 to 102LN are arranged at positions at which detection zenith angles are different. An angle formed by a detection direction (center direction of a detection opening) by the detection unit 102 with respect to the normal of the sample 1 is defined as the detection zenith angle.

The detection unit 102 is configured by appropriately using high angle detection units 102H1 to 102HN having a detection zenith angle of 45 degrees or less and low angle detection units 102L1 to 102LN having a detection zenith angle of 45 degrees or more. The high angle detection units 102H1 to 102HN and the low angle detection units 102L1 to 102LN are constituted by a plurality of detection units so as to cover scattered light rays scattered in multiple azimuths at the detection zenith angles.

Figure 8B:
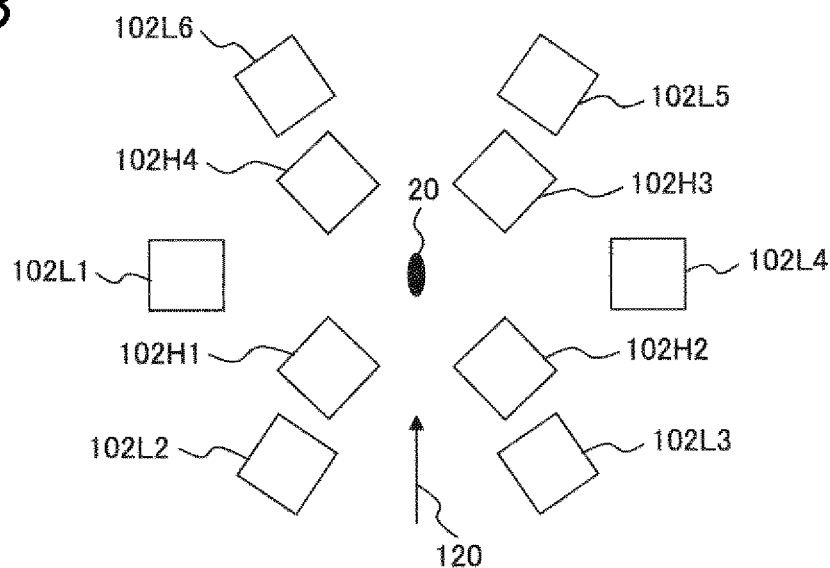
FIG. 8B is a plan view of the arrangement and detection direction of the detection unit including the high angle detection unit and the low angle detection unit according to the first embodiment of the present invention as viewed from above.

FIG. 8B shows a plan view of a state in which the high angle detection units 102H1 to 102HN and the low angle detection units 102L1 to 102LN are arranged as shown in FIG. 8A. In the configuration shown in FIG. 8B, an example in which four high angle detection units 102H1 to 102HN are arranged and six low angle detection units 102L1 to 102LN are arranged is shown.

Figure 8C:
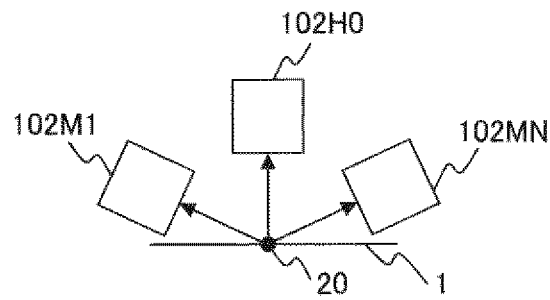
FIG. 8C is a side view of the arrangement and detection direction of the detection unit including a vertical detection unit and an intermediate angle detection unit according to the first embodiment of the present invention as viewed from the side.

On the other hand, FIG. 8C shows a side view of a state in which a detection unit 102H0 is disposed in a normal direction of the sample 1 and a plurality of intermediate angle detection units 102M1 to 102MN is arranged at a position of a certain detection zenith angle.

Figure 8D:
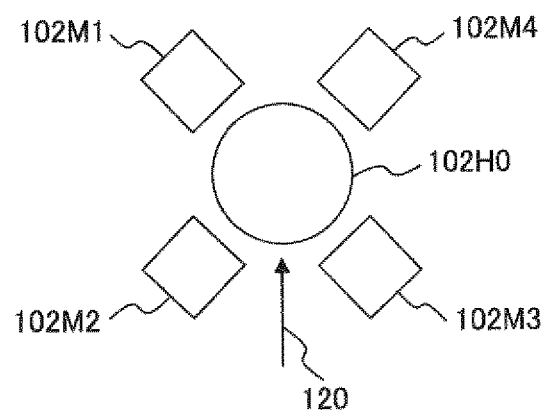
FIG. 8D is a plan view of the arrangement and detection direction of the detection unit including the vertical detection unit and the intermediate angle detection unit according to the first embodiment of the present invention as viewed from above.

FIG. 8D shows a plan view of a state in which the detection unit 102H0 and the intermediate angle detection units 102M1 to 102MN are arranged as shown in FIG. 8C. In the configuration shown in FIG. 8D, an example in which four intermediate angle detection units 102M1 to 102M4N are arranged around the detection unit 102H0 in the normal direction is shown.

Figure 9:
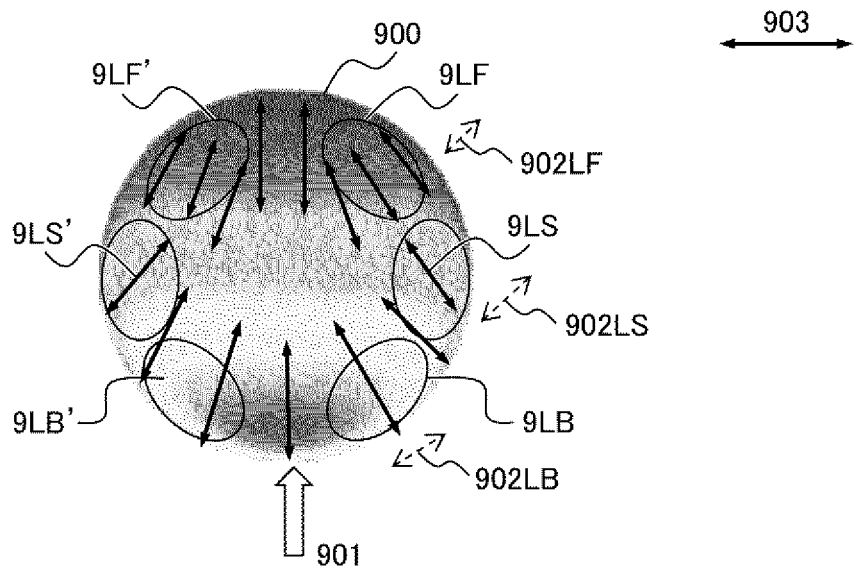
FIG. 9 is a plan view of the arrangement of the low angle detection unit and a polarization direction of scattered light from the sample surface according to the first embodiment of the present invention as viewed from above.

FIG. 9 shows azimuth and the zenith angles detected by the low angle detection units 102L1 to 102L6 shown in FIGS. 8A and 8B. A detection region of each detection unit is three-dimensionally defined by the zenith angle and the azimuth angle. A reference sign 900 displays a distribution of scattered light when the zenith angle is a radius r and the azimuth angle is an angle θ. A reference sign 901 indicates an incident direction of oblique illumination of P-polarized light. An arrow indicated by 903 is a polarization direction of the scattered light from the sample 1. Reference signs 9LF, 9LF', 9LS, 9LS'9LB, and 9LB' indicate regions of the scattered light detected by the low angle detection units 102L1 to 102L6.

The scattered light generated from the region 9LF is the forward-scattered light, the scattered light generated from the region 9LB is the back-scattered light, and in general, scattered light intensity of the forward-scattered light generated from the region 9LF is weaker than that of the backscattered light generated from the region 9LB. That is, the forward-scattered light generated from the region 9LF has a relatively stronger contrast with respect to background scattered light of the defect than that of the back-scattered light generated from the region 9LB. Arrows 902LF, 902LS, and 902LB indicated by dotted lines represent polarization directions orthogonal to the polarization of the scattered light from the sample 1 in the regions 9LF, 9LS, and 9LB, respectively.

Figure 10A:
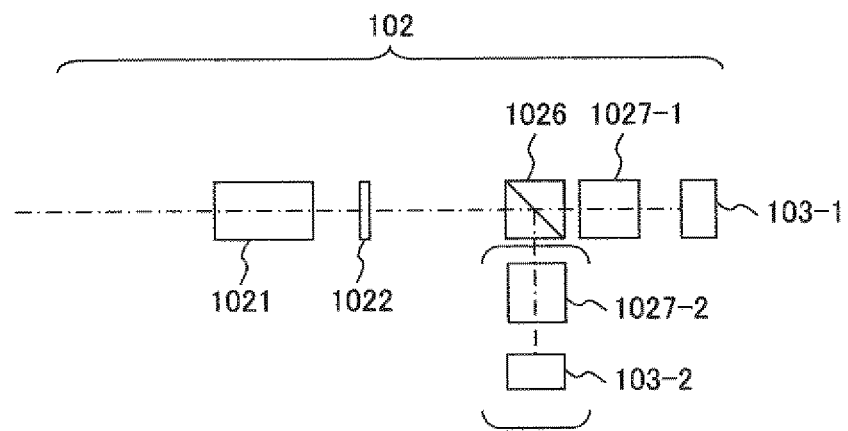
FIG. 10A is a block diagram showing a first example of a configuration of a detection optical system according to the first embodiment of the present invention.

FIG. 10A shows a configuration of the detection unit 102. A reference sign 1021 is an objective lens, and the scattered light from the sample 1 is incident on the objective lens 1021 from the left side of the figure. A reference sign 1022 is a birefringence phase difference control unit having birefringence characteristics. The birefringence phase difference control unit 1022 is disposed at a pupil position of the objective lens 1021 or at a position conjugate with the pupil position. A reference sign 1026 is a polarization selection element, and typically uses a polarization beam splitter. Reference signs 1027-1 and 1027-2 are imaging lenses, and reference signs 103-1 and 103-2 are photoelectric conversion units (sensors). Photomultipliers are applied as the photoelectric conversion units 103-1 and 103-2. Alternatively, a silicon photomultiplier tube (silicon photo-multiplier: SiPM) may be used.

The photoelectric conversion units 103-1 and 103-2 convert an incident light amount into an electric signal and output the electric signal. The polarization selection element 1026 branches the light into two optical paths and outputs the light rays according to the polarization characteristics of the incident light. The birefringence phase difference control unit 1022 controls the polarization direction such that scattered light from a sufficiently small foreign substance defect on the sample 1 with respect to a wavelength size of the illumination light applied to the sample 1 is stronger than the background scattered light of the defect at the position of the photoelectric conversion unit 103-1. Accordingly, detection sensitivity of the defect can be improved.

Since the defect is not necessarily the foreign substance, the polarization direction of the light scattered from the defect is different from an assumed direction, and the photoelectric conversion unit 103-1 may detect only weak scattered light from the defect. In such a defect, the photoelectric conversion unit 103-2 detects a strong defect signal. The device can be constructed even though the imaging lens 1027-2 and the photoelectric conversion unit 103-2 are omitted.

Figure 10B:
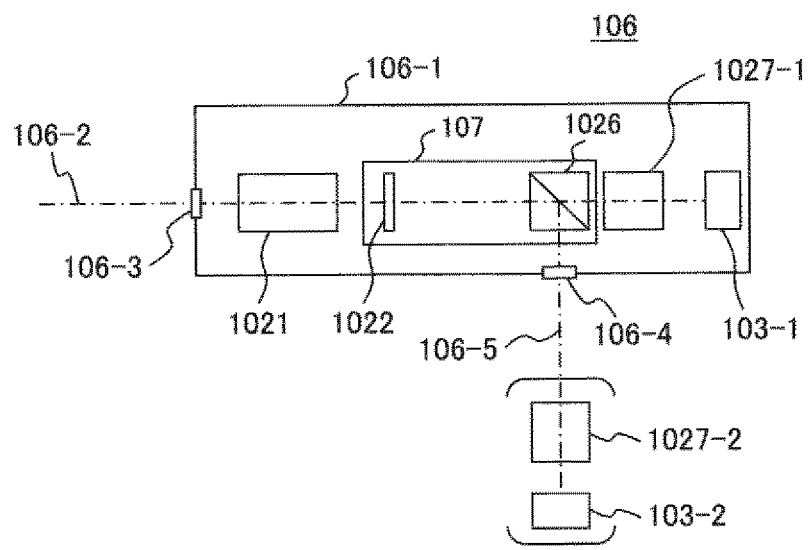
FIG. 10B is a block diagram showing a configuration in which the detection optical system according to the first embodiment of the present invention is implemented as an optical module.

FIG. 10B shows a configuration of an optical module 106 modularized including the detection unit 102 described with reference to FIG. 10A. The optical module 106 shown in FIG. 10B is an optical module used by being incorporated in a detection optical system, and includes, as a configuration corresponding to the detection unit 102 described with reference to FIG. 10A, the objective lens 1021, a polarized light transmission control unit 107, an imaging lens 1027, the photoelectric conversion unit 103-1, and a housing 106-1 that holds these optical elements.

The incident light incident on the optical module 106 from the left side of FIG. 10B (an optical axis of the incident light is assumed as an optical axis 106-2) is incident on the objective lens 1021 through an optical window 106-3 provided at an end portion of the housing 106-1 on a light receiving side, and is further incident on the polarized light transmission control unit 107.

The polarized light transmission control unit 107 includes the birefringence phase difference control unit 1022 that controls the polarization direction and the polarization selection element 1026 that selectively transmits light in a specific polarization state by branching an optical path corresponding to the polarization characteristics of the incident light. The light incident on the birefringence phase difference control unit 1022 is decomposed according to the polarization state and is incident on the polarization selection element 1026.

The polarization selection element 1026 transmits only the light in the specific polarization state, and scatters light rays in other polarization states in an off-axis direction of a first optical axis 106-2 (or branches a second optical axis 106-5 from the first optical axis 106-2). The light transmitted through the polarization selection element 1026 is incident on the imaging lens 1027, is further converged by an imaging lens 1027-1, and reaches the photoelectric conversion unit 103-1.

The light branched to the second optical axis 106-5 by the polarization selection element 1026 is emitted to the outside of the housing 106-1 through a second optical window 106-4. The optical windows for releasing the branched light rays to the outside of the module, and thus, there is no possibility that the branched light rays become stray light rays inside the module and interferes with the light detection of the photoelectric conversion unit 103-1.

As a different embodiment, it is also possible to apply light transmission units each having an opening portion for transmitting light as an alternative to the optical windows 106-3 and 106-4. As described above, the present invention can be variously modified without departing from the gist thereof.

The optical module of the present practical example can selectively guide only the incident light in the specific polarization state to the photoelectric conversion unit 103-1. Accordingly, when a plurality of optical modules 106 including polarized light transmission control units 107 having different polarization transmission characteristics are prepared and the incident light rays are detected, light rays in a plurality of polarization states can be detected in parallel.

Such characteristics are characteristics suitable for the detection optical system of the optical inspection device, and can cope with a change in the polarization state of the scattered light due to a material and a surface state (presence or absence of a film, a film thickness, a film quality, and the like) of a sample to be inspected by incorporating the optical module of the present practical example into the optical inspection device. Accordingly, an optical inspection device having a high detection S/N can be achieved.

The optical module 106 in FIG. 10B does not include the branched optical axis (second optical axis 106-5), but may include the imaging lens 1027-2 and the photoelectric conversion unit 103-2 which is a second sensor disposed on the branched optical axis. In this case, since the light traveling on the branched optical axis reaches the photoelectric conversion unit 103-2, the detection of the light traveling on the first optical axis 106-2 is not interfered. The second optical window 106-4 is unnecessary.

Figure 11:
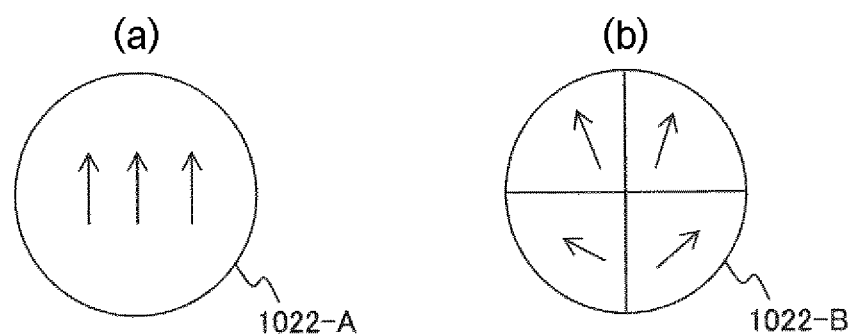
FIG. 11 is a diagram showing an embodiment of a fast phase axis of a birefringence phase difference control unit according to the first embodiment of the present invention, in which (a) shows a case where the fast phase axis is in a fixed direction in a plane and (b) shows a state in which the fast phase axis is set for each divided region.

FIG. 11 shows a practical example of the birefringence phase difference control unit 1022. Both a reference sign 1022-A in (a) and a reference sign 1022-B in (b) are birefringence phase difference control units and are placed at a pupil position of the objective lens 1021. A relay lens may be appropriately disposed between the objective lens 1021 and the birefringence phase difference control unit 1022, and may be disposed at a position conjugate with the pupil. Arrows in the figure indicate fast phase axis directions. Fast phase axes are set in a fixed direction in the plane in the birefringence phase difference control unit 1022-A in (a), but fast phase axes are independently set for divided regions in the birefringence phase difference control unit 1022-B in (b).

In both the birefringence phase difference control unit 1022-A in FIG. 11(*a*) and the birefringence phase difference control unit 1022-B in (b), a phase difference due to birefringence between the fast phase axis and the slow phase axis is shifted from an integral multiple of ¼ of the wavelength. Typically, the phase shift is near ½ of the wavelength and changes depending on the surface of the sample 1.

Electric field strength of the reflected scattered light from the sample 1 in a horizontal direction of the light at the pupil position of the objective lens or the position conjugate with the pupil is expressed as (Equation 1), and the electric field strength in a vertical direction of the light is expressed as (Equation 2).

[Math. 1]
$$E_x(Z)=E_x 0 \exp(-ikZ) \quad \text{(Equation 1)}$$

[Math. 2]
$$E_y(Z)=E_y 0 \exp(-ikZ+i\alpha) \quad \text{(Equation 2)}$$

A reference sign Z indicates the traveling direction of the light. When a phase difference $\alpha$ between the horizontal direction and the vertical direction is an integral multiple of 180 degrees, the scattered light can be regarded as linearly polarized light.

Figure 12:
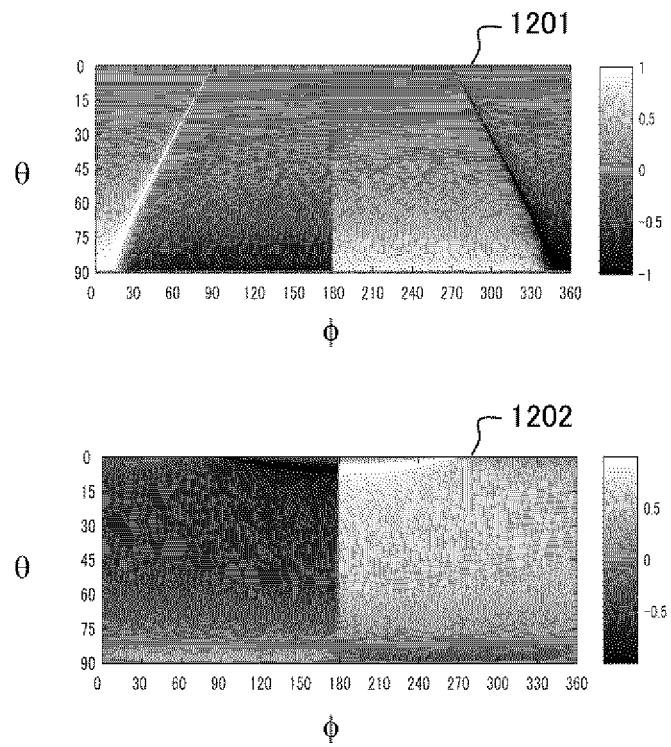
FIG. 12 is a diagram showing a simulation result of a phase difference distribution of detected light according to a first embodiment of the present invention, in which (a) is a diagram showing a phase difference distribution of scattered light from a silicon wafer and (b) is a diagram showing a phase difference distribution of scattered light from a defect sufficiently smaller than a wavelength.

FIG. 12 shows a distribution of $\sin(\alpha)$ of the scattered light obtained when the silicon wafer is irradiated with the P-polarized light. Here, $\theta$ is an angle from the zenith, and $\varphi$ is an angle in a horizontal plane. The illumination is incident at a low elevation angle from a direction in which $\varphi$ is 180 degrees. A distribution diagram 1201 is the scattered light rays from the silicon wafer. In a region where $\theta$ is small, $\sin(\alpha)$ is close to zero and is relatively close to the linearly polarized light, but as $\theta$ becomes closer to 90 degrees, $\sin(\alpha)$ is shifted from zero and is shifted from the linearly polarized light.

A distribution diagram 1202 is a distribution of phase differences between scattered light rays from the defect that is sufficiently small for the wavelength. From the distribution of $\sin(\alpha)$, it can be seen that when $\theta$ is around 90 degrees, $\sin(\alpha)$ is the linearly polarized light, and as $\theta$ becomes smaller, the $\sin(\alpha)$ is shifted from the linearly polarized light. As described above, both the scattered light from the defect and the scattered light from the sample surface as the background thereof are elliptically polarized light, and the shift from the linearly polarized light is different between the scattered light rays from the defect and the sample surface.

In the case of the elliptically polarized light, the polarization selection element 1026 cannot completely separate this polarized light from the incident light and cannot guide the incident light to a specific optical path. The birefringence phase difference control unit 1022 shifts the phase difference between the fast phase axis and the slow phase axis from the ½ wavelength, and thus, the elliptically polarized light is approximated to the linearly polarized light. This problem cannot be resolved by using the ¼ wave plate as shown in PTL 1 in combination with the ½ wave plate.

For example, the illumination unit on which only light in a specific polarization direction is incident can convert the elliptically polarized light into the linearly polarized light by adjusting the angle between the polarization direction and the fast phase axis or the slow phase axis of the ¼ wave plate. This is because at least the light rays in two different polarization directions, that is, the scattered light from the defect and the scattered light from the sample surface are incident on the detection unit 102.

In the ¼ wave plate of which the phase is shifted by 90 degrees, when a rotation angle is decided in order to control one light, a side effect of shifting the phase of the light in the other polarization direction too much is caused. Thus, the phase difference between the fast phase axis and the slow phase axis of the birefringence phase difference control unit 1022 shown in FIG. 11 is shifted from 90 degrees, and thus, this side effect is suppressed. A structure thereof is shown in FIGS. 13A and 13B.

Figure 13A:
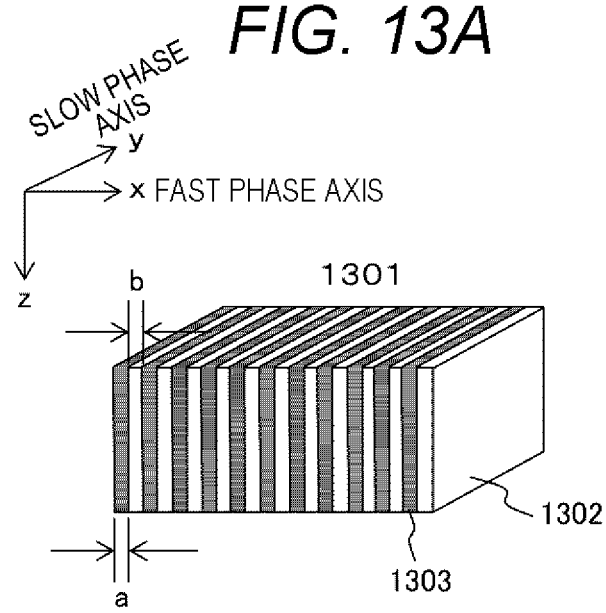
FIG. 13A is a configuration diagram of the birefringence phase difference control unit according to the first embodiment of the present invention, and is a perspective view of a state in which the birefringence phase difference control unit is formed by alternately arranging two substances having different refractive indexes having high transmittance with respect to a wavelength of incident light in a fast phase direction.

A birefringence phase difference control unit 1301 shown in FIG. 13A represents one form of the birefringence phase difference control unit 1022 described with reference to FIG. 10A. The birefringence phase difference control unit 1301 is constituted by two substances 1302 and 1303 which have high transmittance with respect to the wavelength of the incident light and have different refractive indexes from each other. Here, pitches a and b in an X direction of the substances 1302 and 1303 are sufficiently narrower the wavelength of the light incident from a Z direction. On the other hand, in a Y direction, the substances have regular shapes in a region in which the pitches are sufficiently longer than the wavelength of the light incident from the Z direction.

At this time, the birefringence phase difference control unit 1301 has birefringence characteristics. An x direction in the figure is the fast phase axis, and a y direction is the slow phase axis. The phase difference between the fast phase axis and the slow phase axis can be decided by a thickness in the Z direction which is the incident direction of the light. Thus, in a typical inspection target, for example, a silicon wafer, when the phase difference is decided such that scattered light rays from an assumed defect and the wafer are most separated at the position of the polarization selection element 1026, the scattered light from the wafer can be separated and detected from the scattered light from the defect.

Figure 13B:
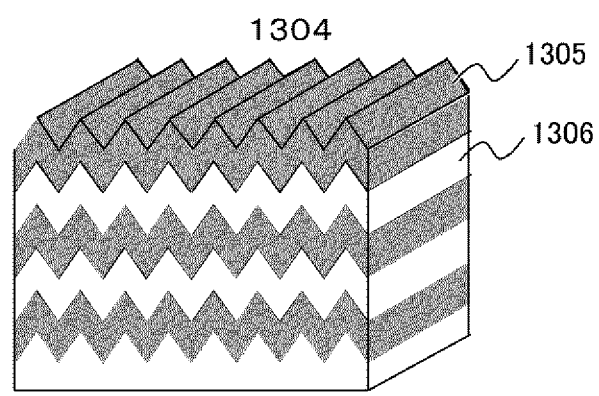
FIG. 13B is a configuration diagram of the birefringence phase difference control unit according to the first embodiment of the present invention, and is a perspective view of a state in which the birefringence phase difference control unit is formed by alternately overlaying substances having two different refractive indexes having high transmittance with respect to the wavelength of the incident light in a z direction.

The birefringence phase difference control unit 1304 shown in FIG. 13B represents another form of the birefringence phase difference control unit 1022. For example, FIG. 5 of NPL 1 discloses an optical device having a similar structure. Substances 1305 and 1306 are substances having refractive indexes having different transmittances with respect to the wavelength of the incident light. The substances have a pitch structure in which pitches are narrower than the wavelength in the X direction, and have the same shape in a region in which the pitches are sufficiently longer than the wavelength in the Y direction.

Even in the structure shown in FIG. 13B, the fast phase axis is in the X direction and the slow phase axis is in the Y direction with respect to the light incident from the Z direction. A thickness of the birefringence phase difference control unit 1304 in the Z direction is decided such that a desired phase difference is generated between the fast phase axis and the slow phase axis of the birefringence phase difference control unit 1304.

Figure 14:
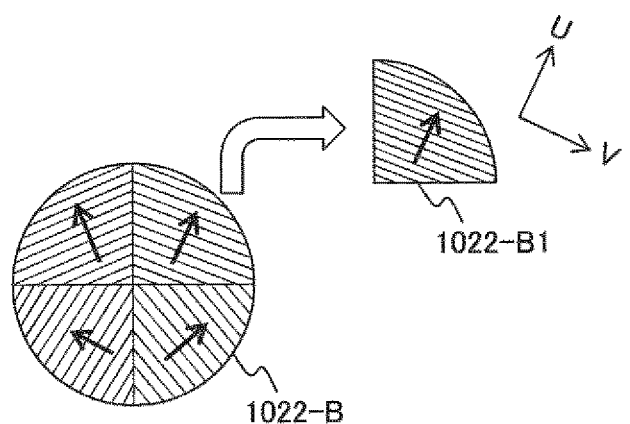
FIG. 14 is a diagram showing a configuration of the birefringence phase difference control unit according to the first embodiment of the present invention and a distribution diagram of phase differences between scattered light rays from the defect sufficiently smaller than the wavelength in a superimposition manner.

When the birefringence phase difference control unit 1022-B as shown in (b) of FIG. 11 is formed with the structure shown in FIG. 13A or FIG. 13B, a pattern sufficiently smaller than the wavelength is formed so as to be orthogonal to the fast phase axis as shown in FIG. 14. In a region 1022-B1 which is a divided region of the birefringence phase difference control unit 1022-B, a pitch direction U of the pattern is the fast phase axis, and V orthogonal to this pitch direction is the slow phase axis.

The plurality of detection units 102 provided in the device has different detection azimuths of the scattered light rays, and incident polarization directions or shifts from the linearly polarized light change. Thus, the fast phase axis direction of the birefringence phase difference control unit 1022-B is optimized in each of the detection systems of 102H1 to 102HN and 102L1 to 102HN. Since the scattered light from the surface of the sample 1 and an important defect change depending on the inspection target, an optimized birefringence phase difference control unit 1022-B may be prepared for inspecting the typical inspection target and may be switched for each target.

Polarization control in the birefringence phase difference control unit 1022 shown in FIG. 14 is represented in (Equation 3). Light In(x, y) incident in a plane (x, y) of the element of the birefringence phase difference control unit 1022 is converted into Out(x, y) and the converted light is output. Inx and Outx indicate polarized light rays in the horizontal direction, and Iny and Outy indicate polarized light rays in the vertical direction, respectively. Here, θ(x, y) is an inclination of the slow phase axis of the element, and n+ΔPθ is a phase shift of the fast phase axis with respect to the slow phase axis.

[Math. 3]

$$\begin{bmatrix} Out_x(x, y) \\ Out_y(x, y) \end{bmatrix} = \begin{bmatrix} \cos\theta(x, y) & -\sin\theta(x, y) \\ \sin\theta(x, y) & \cos\theta(x, y) \end{bmatrix}$$
$$\begin{bmatrix} 1 & 0 \\ 0 & \cos(\pi + \Delta P_\theta) - i\sin(\pi + \Delta P_\theta) \end{bmatrix} \begin{bmatrix} \cos\theta(x, y) & \sin\theta(x, y) \\ -\sin\theta(x, y) & \cos\theta(x, y) \end{bmatrix}$$
$$\begin{bmatrix} In_x(x, y) \\ In_y(x, y) \end{bmatrix} = \begin{bmatrix} \cos\theta(x, y) & -\sin\theta(x, y) \\ \sin\theta(x, y) & \cos\theta(x, y) \end{bmatrix} \begin{bmatrix} 1 & 0 \\ 0 & -1 \end{bmatrix}$$
$$\begin{bmatrix} 1 & 0 \\ 0 & \cos\Delta P_\theta - i\sin\Delta P_\theta \end{bmatrix} \begin{bmatrix} \cos\theta(x, y) & -\sin\theta(x, y) \\ -\sin\theta(x, y) & \cos\theta(x, y) \end{bmatrix} \begin{bmatrix} In_x(x, y) \\ In_y(x, y) \end{bmatrix}$$

(Equation 3)

In general, the phase shift is 90 degrees or less, that is, ¼ or less of the wavelength.

Figure 15:
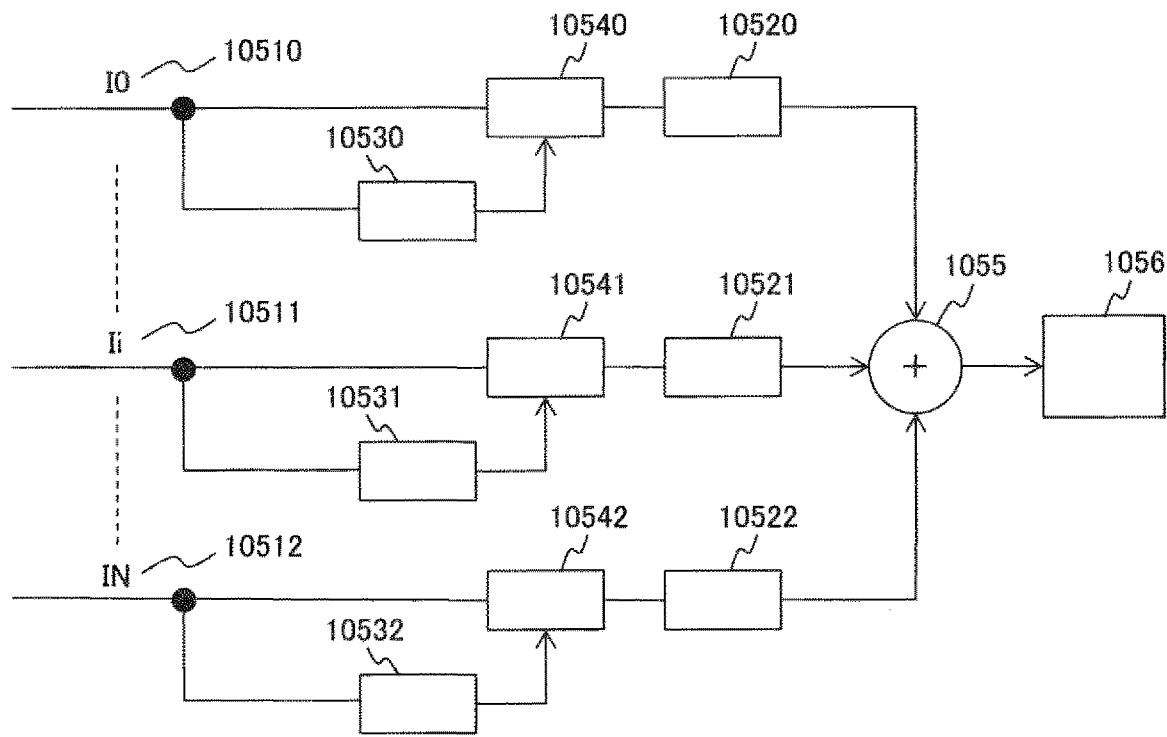
FIG. 15 is a block diagram showing a configuration of a data processing unit according to the first embodiment of the present invention.

FIG. 15 shows an embodiment of a specific determination method. In FIG. 15, the light amounts from the photoelectric conversion units 103-1 provided in the plurality of detection units 102 provided in the device are indicated by reference signs 10510 to 10512, respectively. Reference signs 10530 to 10532 are low-frequency filters, and 10540 to 10542 are difference engines, and radio frequency signals of the light amounts 10510 to 10512 from photoelectric conversion units 103-1 provided in the plurality of detection units 102 are output, respectively. Reference signs 10520 to 10522 are gain multipliers.

A reference sign 1055 is an adder and increases defect signal intensity by adding signals output from the gain multipliers 10520 to 10522. A reference sign 1056 is a defect determination unit, and the defect determination unit determines that there is the defect when an output signal of the adder 1055 exceeds a predetermined threshold value. Since the amount of scattered light from the defect is typically proportional to a defect size to the 6th power, the defect size is calculated from the defect signal obtained based on the ⅙ power of the amount of scattered light of the defect. Detected defect information is transmitted to the control unit 53 and is then output to the display unit 54.

According to the present embodiment, the polarized light transmission element typically sets a phase difference of a non-integer multiple of 90 degrees between the fast phase axis and the slow phase axis for the light rays collected by the detection optical systems, the transmission of the scattered light from the sample surface in the polarized light transmission unit is decreased, whereas the transmittance of the scattered light from the defect is increased. Accordingly, the intensity of the scattered light from the defect is set to be relatively stronger than the scattered light from the sample surface, and thus, it is possible to achieve high-speed and high-sensitivity defect detection.

Second Embodiment

Figure 16:
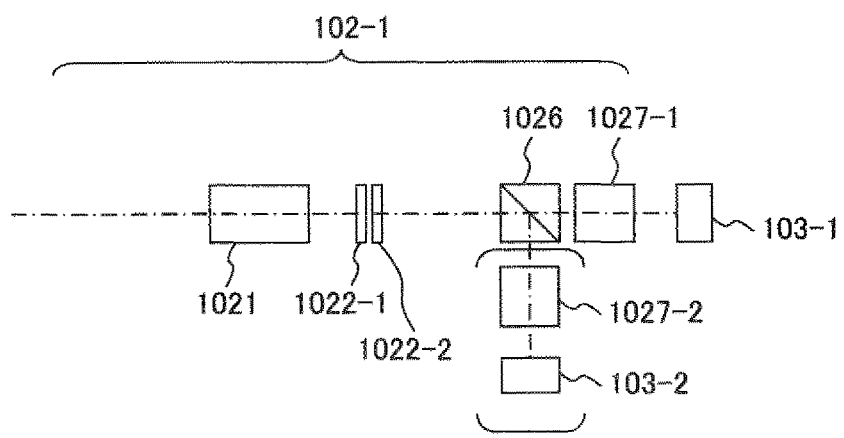
FIG. 16 is a block diagram showing a configuration of a detection optical system according to a second embodiment of the present invention.

FIG. 16 shows another embodiment of the birefringence phase difference control unit 1022 in the first embodiment shown in FIG. 10A. A configuration of a detection unit 102-1 shown in FIG. 16 is almost the same as the configuration of the detection unit 102 shown in FIG. 10A, and the same reference signs are assigned to the same parts. In the configuration of the detection unit 102-1 shown in FIG. 16, the birefringence phase difference control unit 1022 of the detection unit 102 shown in FIG. 10A is separated into two units of a first birefringence phase difference control unit 1022-1 and a second birefringence phase difference control unit 1022-2. The first birefringence phase difference control unit 1022-1 has a fast phase axis and a slow phase axis in directions similar to the birefringence phase difference control unit 1022-A or 1022-B described with reference to FIG. 11. A phase difference between the fast phase axis and the slow phase axis is 180 degrees, that is, ½ of the wavelength.

(Equation 4) represents a modification example of (Equation 3).

[Math. 4]

$$\begin{bmatrix} \text{Out}_x(x,y) \\ \text{Out}_y(x,y) \end{bmatrix} = \begin{bmatrix} \cos\theta(x,y) & -\sin\theta(x,y) \\ \sin\theta(x,y) & \cos\theta(x,y) \end{bmatrix} \begin{bmatrix} 1 & 0 \\ 0 & -1 \end{bmatrix}$$
$$\begin{bmatrix} 1 & 0 \\ 0 & \cos\Delta P_\theta - i\sin\Delta P_\theta) \end{bmatrix} \begin{bmatrix} \cos\theta(x,y) & s\cdot\cdot\theta(x,y) \\ -\sin\theta(x,y) & \cos\theta(x,y) \end{bmatrix}$$
$$\begin{bmatrix} \text{In}_x(x,y) \\ \text{In}_y(x,y) \end{bmatrix} \approx \begin{bmatrix} \cos\theta(x,y) & -\sin\theta(x,y) \\ \sin\theta(x,y) & \cos\theta(x,y) \end{bmatrix} \begin{bmatrix} 1 & 0 \\ 0 & -1 \end{bmatrix}$$
$$\begin{bmatrix} \cos\theta(x,y) & \sin\theta(x,y) \\ -\sin\theta(x,y) & \cos\theta(x,y) \end{bmatrix} \begin{bmatrix} \cos\overline{\theta(x,y)} & -\sin\overline{\theta(x,y)} \\ \sin\overline{\theta(x,y)} & \cos\overline{\theta(x,y)} \end{bmatrix}$$
$$\begin{bmatrix} 1 & 0 \\ 0 & \cos\Delta P_\theta - i\sin\Delta P_\theta \end{bmatrix} \begin{bmatrix} \cos\overline{\theta(x,y)} & \sin\overline{\theta(x,y)} \\ -\sin\overline{\theta(x,y)} & \cos\overline{\theta(x,y)} \end{bmatrix} \begin{bmatrix} \text{In}_x(x,y) \\ \text{In}_y(x,y) \end{bmatrix}$$

(Equation 4)

Here, $\overline{\theta(x,y)}$ is an average value of $\theta(x,y)$ in the plane.

The birefringence phase difference control unit 1022-2 inserts a wave plate which corresponds to the second item of Equation 4 and in which the slow phase axis is $\overline{\theta(x,y)}$ and the phase of the fast phase axis is shifted by $\Delta P\theta$. A wave plate having the same configuration as 1022-A is applied as this wave plate. 1022-1 and 1022-2 are configured to be independently rotatable, and thus, the adjustment corresponding to the actual inspection target can be performed.

According to the present embodiment, in addition to the effects described in the first embodiment, the polarization detection according to the actual inspection target can be adjusted, and the inspection with higher defect detection sensitivity can be performed.

Third Embodiment

Figure 17:
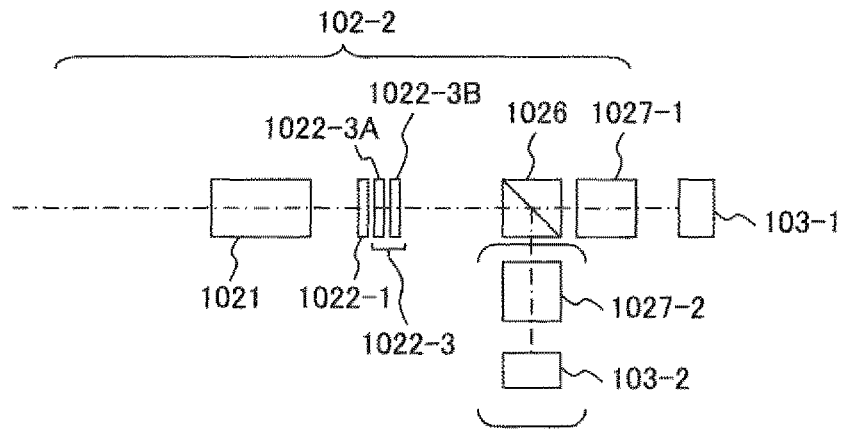
FIG. 17 is a block diagram showing a configuration of a detection optical system according to a third embodiment of the present invention.

FIG. 17 shows still another embodiment of the birefringence phase difference control unit 1022 in the first embodiment shown in FIG. 10A. A configuration of a detection unit 102-2 shown in FIG. 17 is almost the same as the configuration of the detection unit 102 shown in FIG. 10A, and the same reference signs are assigned to the same parts. In the configuration of the detection unit 102-2 shown in FIG. 17, the birefringence phase difference control unit 1022 of the detection unit 102 shown in FIG. 10A is separated into two unit of a first birefringence phase difference control unit 1022-1 and a third birefringence phase difference control unit 1022-3.

The first birefringence phase difference control unit 1022-1 is the same element as that of the birefringence phase difference control unit 1022 in FIG. 10A or the first birefringence phase difference control unit 1022-1 in FIG. 16. That is, the birefringence phase difference control unit 1301 described with reference to FIG. 13A or the birefringence phase difference control unit 1304 described with reference to FIG. 13B can also be used as the first birefringence phase difference control unit 1022-1. On the other hand, the third birefringence phase difference control unit 1022-3 includes two rotatable ¼ wave plates 1022-3A and 1022-3B.

Figure 18:
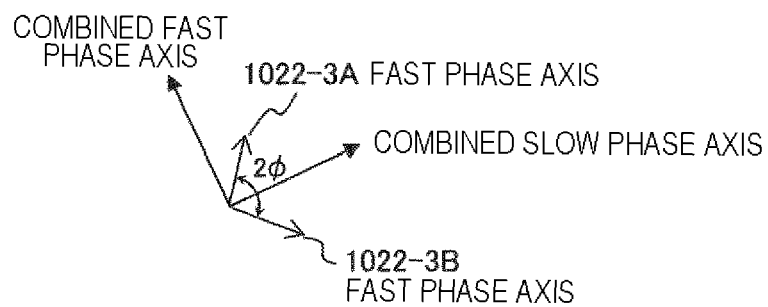
FIG. 18 is a diagram showing a slow phase axis and a fast phase axis when a birefringence phase difference control unit includes two wave plates according to the third embodiment of the present invention.

FIG. 18 shows a correspondence between the fast phase axes of the two rotatable ¼ wave plates 1022-3A and 1022-3B. The angle of the fast phase axes of the two rotatable ¼ wave plates 1022-3A and 1022-3B forms an angle of 2φ.

Here, the Jones matrix of 1022-3 is as represented in (Equation 6) with the axes forming φ with the two fast phase axes as a reference.

[Math. 5]

$$\varphi = (\alpha + \delta)/4 \quad \text{(Equation 5)}$$

[Math. 6]

$$\begin{bmatrix} \cos\varphi & -\sin\varphi \\ \sin\varphi & \cos\varphi \end{bmatrix} \begin{bmatrix} 1 & 0 \\ 0 & -i \end{bmatrix} \begin{bmatrix} \cos\varphi & \sin\varphi \\ -\sin\varphi & \cos\varphi \end{bmatrix} \begin{bmatrix} \cos\varphi & \sin\varphi \\ -\sin\varphi & \cos\varphi \end{bmatrix} \begin{bmatrix} 1 & 0 \\ 0 & -i \end{bmatrix}$$
$$\begin{bmatrix} \cos\varphi & -\sin\varphi \\ \sin\varphi & \cos\varphi \end{bmatrix} =$$
$$\begin{bmatrix} 4i\cos^4\varphi + (2-4i)\cos^2\varphi - 1 & (2i\cos\varphi - 4i\cos^3\varphi)\sin\varphi \\ (4i\cos^3\varphi - 2i\cos\varphi)\sin\varphi & 4i\cos^4\varphi + (-4i-2)\cos^2\varphi + 1 \end{bmatrix} =$$
$$\begin{bmatrix} i\dfrac{\cos 4\varphi - 1}{2} + \cos 2\varphi & -\dfrac{i}{2}\sin 4\varphi \\ \dfrac{i}{2}\sin 4\varphi & i\dfrac{\cos 4\varphi - 1}{2} - \cos 2\varphi \end{bmatrix}$$

(Equation 6)

Here, when $\delta$ is an angle close to zero, (Equation 6) can be approximated as (Equation 7).

[Math. 7]

$$\begin{bmatrix} i\dfrac{\cos 4\varphi - 1}{2} + \cos 2\varphi & -\dfrac{i}{2}\sin 4\varphi \\ \dfrac{i}{2}\sin 4\varphi & i\dfrac{\cos 4\varphi - 1}{2} - \cos 2\varphi \end{bmatrix} \approx$$
$$\begin{bmatrix} -i - \dfrac{\delta}{2} & i\delta \\ -i\delta & -i + \dfrac{\delta}{2} \end{bmatrix}$$

(Equation 7)

Practically, $\delta$ is $\pi/4$ radians or less.

From (Equation) 7, both phases of a (1, 1) component and a (2, 2) component of a conversion matrix advance, and thus, a phase of a fast phase axis of the third birefringence phase difference control unit 1022-3 in which the two rotatable ¼ wave plates 1022-3A and 1022-3B are integrated does not advance significantly with respect to the slow phase axis. Accordingly, polarization control can be performed such that the elliptically polarized light can be approximated to the linearly polarized light with few side effects.

In the method described in the third embodiment, the phase of the fast phase axis can be adjusted by δ. Since there is no need to prepare, as the third birefringence phase difference control unit 1022-3, a polarization control element having a predetermined phase difference assumed in advance there is an advantage that device cost can be reduced.

Although an example in which the two rotatable ¼ wave plates 1022-3A and 1022-3B are used has been shown in the present embodiment, the present invention is not necessarily limited thereto. Two wave plates in which the phase difference between the slow phase axis and the fast phase axis is a phase difference of a non-integer multiple of 180 degrees are arranged so as to satisfy the relationship represented in (Equation 5), and thus, it is possible to control the phase difference.

According to the present embodiment, in addition to the effects described in the first embodiment, the phase difference according to the actual inspection target can be adjusted, and the inspection with higher defect detection sensitivity can be performed.

Fourth Embodiment

Figure 19:
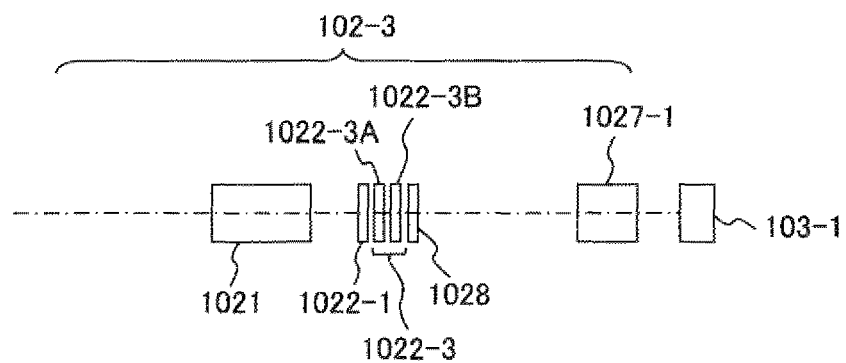
FIG. 19 is a block diagram showing a configuration of a detection optical system according to a fourth embodiment of the present invention.

FIG. 19 shows an example of still another practical example of the detection unit 102 in the first embodiment described with reference to FIG. 10A. A configuration of a detection unit 102-3 shown in FIG. 19 is almost the same as the configuration of the detection unit 102-2 described with reference to FIG. 17 in the third embodiment, and the same reference signs are assigned to the same parts.

In the configuration of the detection unit 102-3 shown in FIG. 19, the specific polarization direction can be detected by the photoelectric conversion unit of 103-1 via the imaging lens 1027-1 by replacing, as the polarization selection element, the polarization selection element 1026 of FIG. 17 with a rotation-controllable polarizing plate 1028, and the imaging lens 1027-2 and the photoelectric conversion unit 103-2 in FIG. 17 are deleted.

According to the present embodiment, it is possible to obtain an effect similar to the effect described in the first embodiment by using the detection unit having a simpler configuration than the first embodiment.

Fifth Embodiment

Figure 20A:
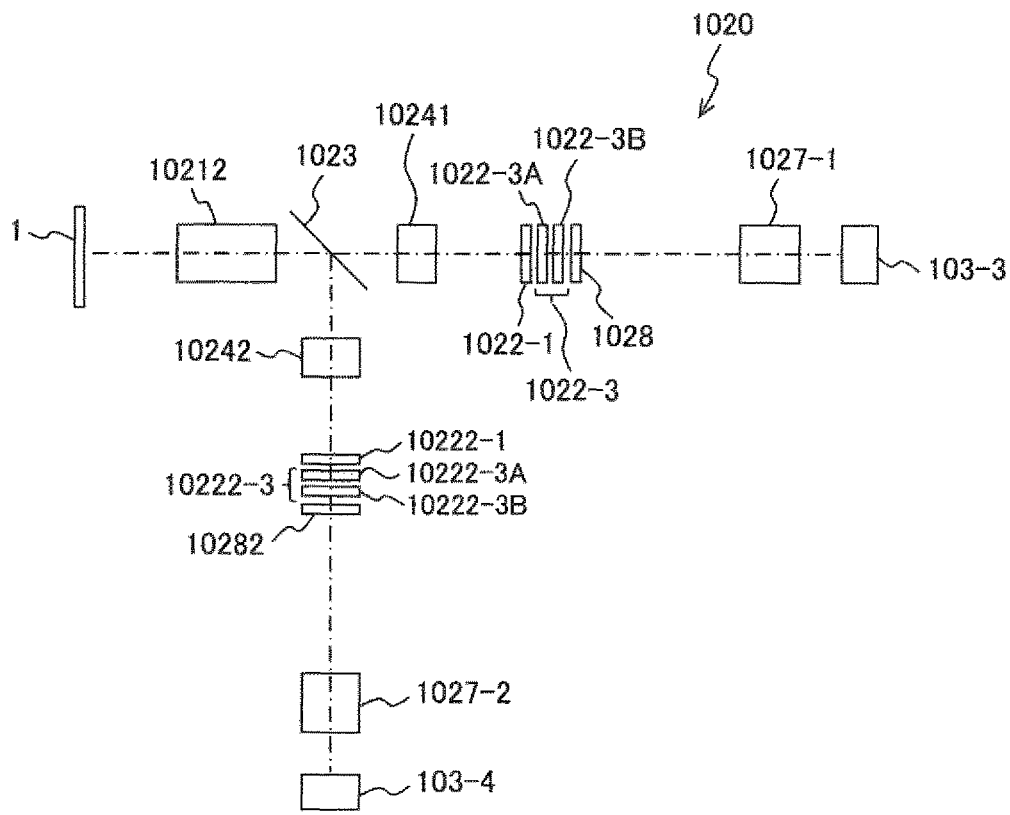
FIG. 20A is a block diagram showing a configuration of a detection optical system according to a fifth embodiment of the present invention.

FIG. 20A shows an example of still another practical example of the detection unit 102 in the first embodiment described with reference to FIG. 10A. In a detection unit 1020 shown in FIG. 20A, an objective lens 10212 is an objective lens having a large numerical aperture, and is disposed such that the normal on the surface of the flat sample 1 and the optical axis coincide with each other. That is, the detection unit 1020 shown in FIG. 20A in the present embodiment is disposed in a direction (normal direction) perpendicular to the surface of the sample 1.

Figure 21:
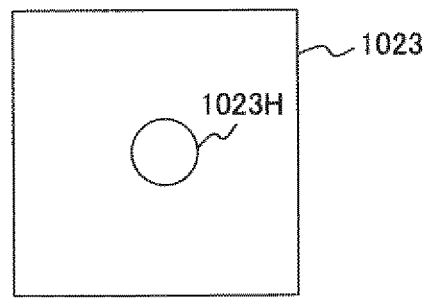
FIG. 21 is a plan view showing a configuration of a mirror having an opening portion for branching an optical path of the detection optical system according to the fifth embodiment of the present invention.

In the detection unit 1020, a mirror 1023 having an opening portion is disposed in a pupil portion of the objective lens 10212. The mirror 1023 has an opening portion 1023H as shown in FIG. 21. The opening portion 1023H is set at a position through which light detected at a center of the optical axis of the objective lens 10212 passes.

The light passed through the center of the optical axis of the objective lens 10212 and passed through the opening portion 1023H of the mirror 1023 is transmitted through a relay lens 10241, a first birefringence phase difference control unit 1022-1, a third birefringence phase difference control unit 1022-3, a polarizing plate 1028, and an imaging lens 1027-1, and is detected by a photoelectric conversion unit 103-3.

On the other hand, the light passed through a portion other than the center of the optical axis of the objective lens 10212 and reflected by the mirror 1023 is incident on the relay lens 10241, is transmitted through the first birefringence phase difference control unit 1022-1, a third birefringence phase difference control unit 1022-3, the polarizing plate 1028, and an imaging lens 1027-1, and is detected by a photoelectric conversion unit 103-4.

The relay lenses 10241 and 10242 relay pupils thereof to positions of the first birefringence phase difference control unit 1022-1 and the first birefringence phase difference control unit 10222-1, respectively.

The first birefringence phase difference control unit 10222-1, the third birefringence phase difference control unit 10222-3, and the polarizing plate 10282 are the same as the first birefringence phase difference control unit 1022-1, the third birefringence phase difference control unit 1022-3, and the polarizing plate 1028, and have the functions described with reference to FIG. 19 in the fourth embodiment. That is, the birefringence phase difference control unit 1301 described with reference to FIG. 13A or the birefringence phase difference control unit 1304 described with reference to FIG. 13B can also be used as the first birefringence phase difference control unit 10222-1.

The photoelectric conversion units 103-3 and 103-4 are imaging types, and a CCD line sensor is applied. In the CCD line sensor, CCD elements are arranged in an array in the S2 direction of the illumination spot 20 (see FIG. 6) which is the region illuminated on the sample surface in a line shape, and the light amounts corresponding to the divided region of the illumination spot 20 are output independently.

The photoelectric conversion units of 103-3 to 103-4 are not limited to the CCD line sensor, and a TDI sensor and a multi-anode photomultiplier sensor can be applied.

Figure 20B:
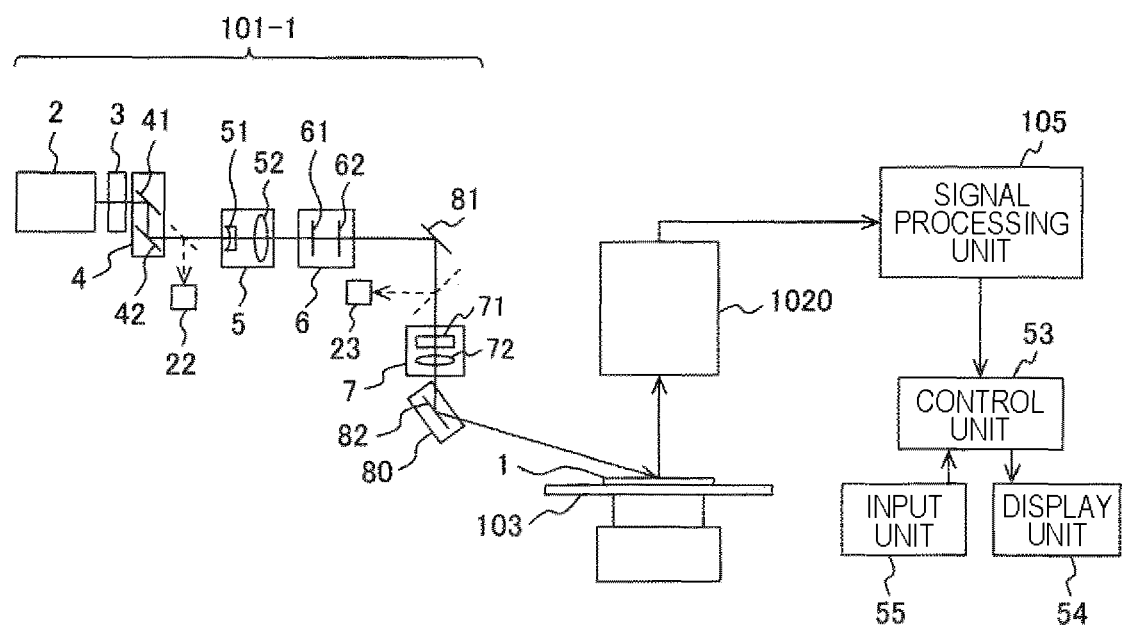
FIG. 20B is a block diagram showing a schematic configuration of a defect inspection device into which the detection optical system according to the fifth embodiment of the present invention is incorporated.

FIG. 20B shows a configuration in which the detection unit 1020 of FIG. 20A is incorporated into the defect inspection device described with reference to FIG. 1. That is, the configuration shown in FIG. 20B is a configuration in which the detection unit 1020 is disposed above the sample 1 by using an illumination unit 101-1 having a configuration in which the mirrors 211, 212, and 213 for illuminating the sample 1 from above, the illumination intensity distribution control unit 7v, and the illumination intensity distribution monitor 24 are removed in the illumination unit 101 of the defect inspection device described with reference to FIG. 1.

According to the present embodiment, the scattered light scattered above the sample 1 can be reliably detected by the detection unit 1020, and a minute foreign substance defect having generation characteristics of the scattered light upward can be reliably detected.

Sixth Embodiment

Figure 22:
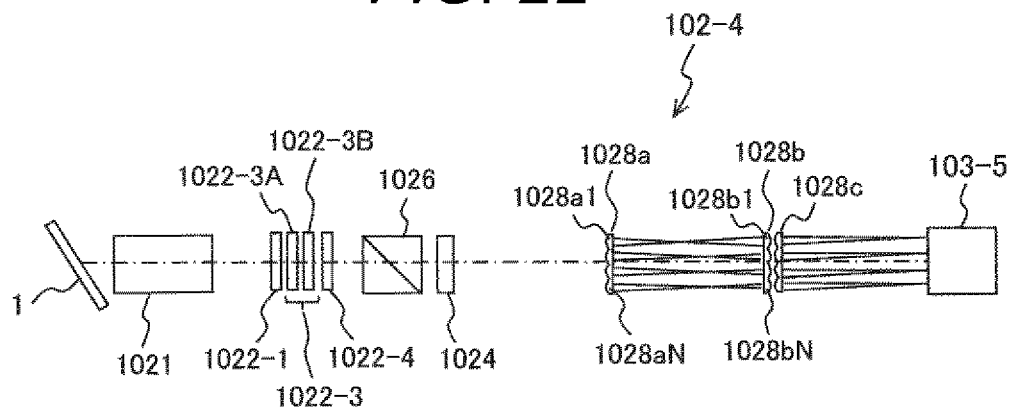
FIG. 22 is a block diagram showing a configuration of a detection optical system according to a sixth embodiment of the present invention.

FIG. 22 shows an example of still another practical example of the detection unit 102 in the first embodiment described with reference to FIG. 10A.

When the detection unit 1020 is constructed by the combination of the imaging type photoelectric conversion units 103-3 to 103-4 and the objective lens 10212 having the large numerical aperture as in the detection unit 1020 of FIG. 20 described in the fifth embodiment, a focal depth of the objective lens 10212 became shallow, and thus, the normal direction of the surface of the sample 1 and the optical axis of the objective lens 10212 need to coincide with each other.

On the other hand, in the present embodiment, as in a detection unit 102-4 shown in FIG. 22, the normal direction of the surface of the sample 1 and the optical axis of the objective lens 1021 do not coincide, and the optical axis of the objective lens 1021 is inclined with respect to the normal direction of the surface of the sample 1.

In the configuration of the detection unit 102-4 shown in FIG. 22, a reference sign 1022-4 is a rotatable ½ wave plate, and controls the polarization direction of the light incident on the polarization selection element 1026. A reference sign 1024 is a relay lens. A reference sign 1028a is a cylindrical lens array, and is formed by arranging a large number of cylindrical lenses 1028a1 to 1028aN. The relay lens 1024 forms an image of the pupil of the objective lens 1021 on the cylindrical lens array 1028a.

A reference sign 1028b is a cylindrical lens array, and is formed by arranging a large number of cylindrical lenses 1028b1 to 1028b2. A reference sign 1028c is also a cylindrical lens array, and forms, on a photoelectric conversion unit 103-5, images of the pupils divided by the cylindrical lenses 1028a1 to 1028aN formed on the cylindrical lens array 1028a.

Since the pupils divided by the cylindrical lenses 1028a1 to 1028aN of the cylindrical lens array 1028a have different tilt angles from the sample 1, when these images are formed on the photoelectric conversion unit 103-5 by a uni-magnification imaging system, sizes of images to be formed become different sizes depending on the position of the photoelectric conversion unit 103-5. Thus, in the present embodiment, the lenses formed on the cylindrical lens array 1028a and the cylindrical lens array 1028b function as beam expanders having different magnifications for the pupils, and the sizes of the images on the photoelectric conversion unit 103-5 are set to be constant.

Although omitted in FIG. 22, the light branched by the polarization selection element 1026 and advances to the lower side of FIG. 22 is used, the relay lens 1024, the cylindrical lens array 1028a, 1028b, and 1028c and the photoelectric conversion unit 103-5 may be arranged as in the combination of the imaging lens 1027-2 and the photoelectric conversion unit 103-2 described in the first embodiment, and an optical system that forms an image of the surface of the sample 1 due to the light branched by the polarization selection element 1026 on the photoelectric conversion unit 103-5 may be further incorporated.

In the present embodiment, the birefringence phase difference control unit 1301 described with reference to FIG. 13A or the birefringence phase difference control unit 1304 described with reference to FIG. 13B can also be used as the first birefringence phase difference control unit 1022-1. The third birefringence phase difference control unit 1022-3 includes two rotatable ¼ wave plates 1022-3A and 1022-3B as in the third embodiment.

Figure 23:
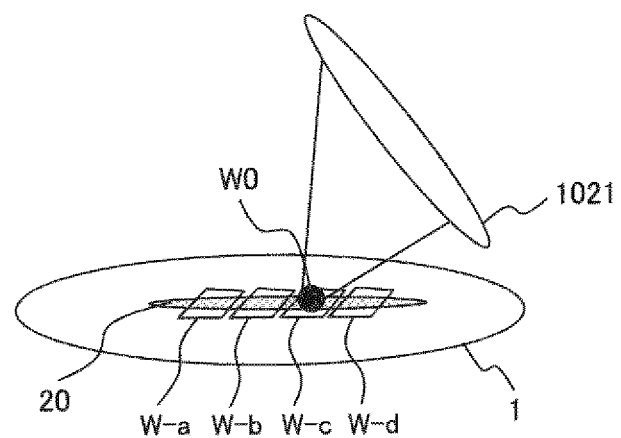
FIG. 23 is a perspective view of a wafer and an objective lens showing a correspondence between an illumination spot on the wafer and an image formation of the detection optical system according to the sixth embodiment of the present invention.

FIG. 23 shows a correspondence between a schematic diagram of the illumination spot 20 on the sample 1 and an image formation from 1028c to 103-5. The illumination spot 20 extends long in the S2 direction in FIG. 8. A reference sign WO indicates a defect to be detected. The photoelectric conversion unit 103-5 divides this illumination spot into W-a to W-d and detects the defect. Although the illumination spot is divided into four parts here, the present invention is not limited to this number, and the present invention can be embodied by setting the number of divisions to an arbitrary integer.

Figure 24:
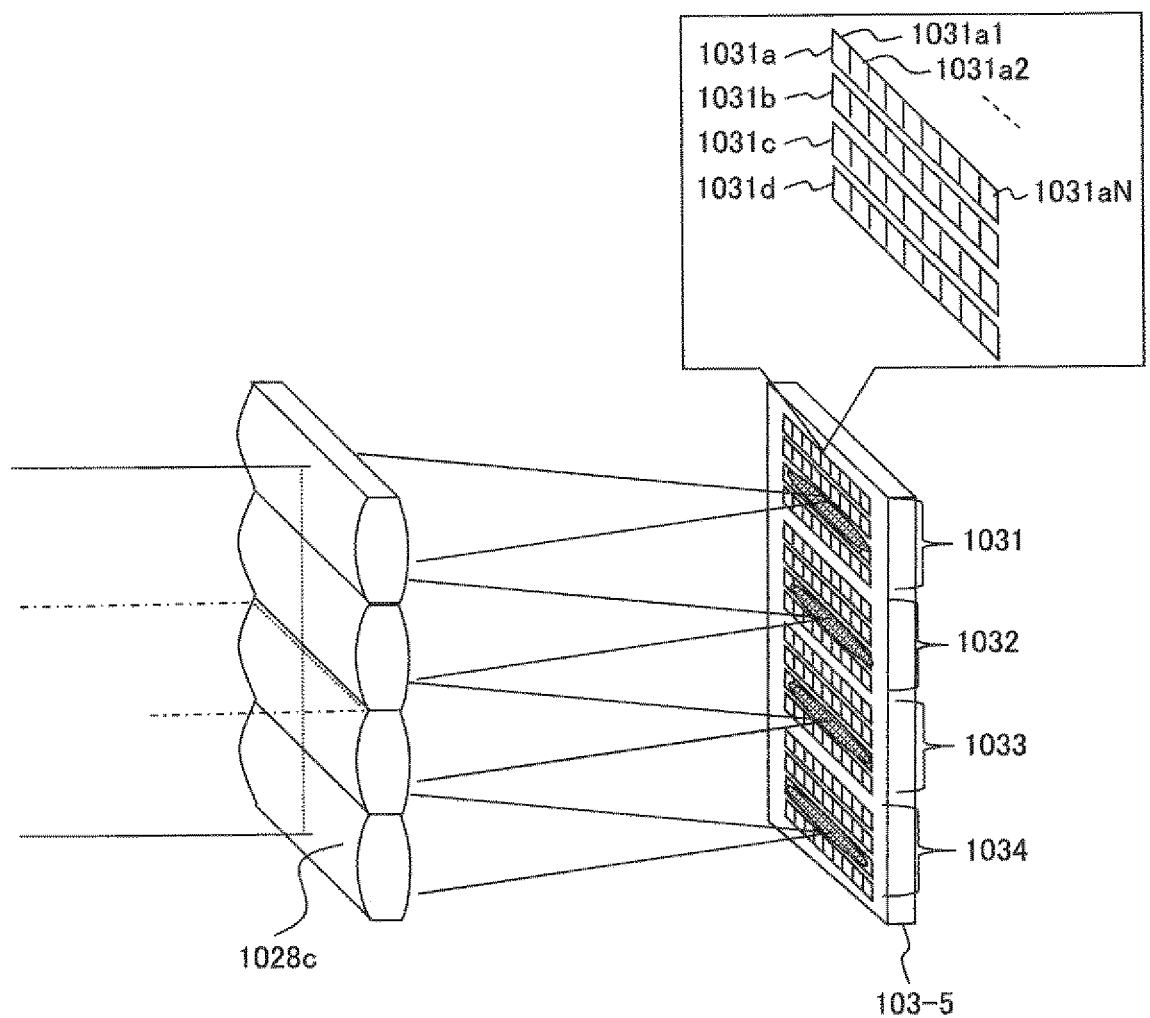
FIG. 24 is a perspective view of a cylindrical lens array and an imaging type photoelectric conversion unit showing an imaging relationship between the cylindrical lens array and the imaging type photoelectric conversion unit according to the sixth embodiment of the present invention.

The scattered light from the defect WO is collected by the objective lens 1021 and is guided to the photoelectric conversion unit 103-5 shown in FIG. 24. In FIG. 24, a reference sign 1028c is a cylindrical lens array that forms an image in only one direction. In the example shown in FIG. 24, the cylindrical lens array 1028c includes four cylindrical lenses at an end. Pixel blocks 1031, 1032, 1033, and 1034 corresponding to the four cylindrical lenses constituting the cylindrical lens array 1028c are formed in the photoelectric conversion unit 103-5.

As shown in FIG. 24, photoelectric elements are formed in a two-dimensional manner in each of the pixel blocks 1031 to 1034. First, the pixel block of 1031 will be described. Reference signs 1031a to 1031d are pixel groups formed in the pixel block 1031, and each pixel group forms an image of light from each division of W-a to W-d at the position of the illumination spot 20 shown in FIG. 23.

Reference signs 1031a1 to 1031aN are pixels belonging to the pixel group 1031a, and each pixel outputs a predetermined current when a photon is incident. Outputs of the pixels belonging to the same pixel group are electrically connected, and one pixel group outputs the total current output of the pixels belonging to the pixel group. Similarly, the pixel blocks 1032 to 1034 also output the total current output corresponding to the divisions of W-a to W-d at the position of the illumination spot 20. The outputs corresponding to the same division from the separate pixel groups 1031a to 1031d are electrically connected, and the photoelectric conversion unit 103-5 outputs the total current output corresponding to the number of photons detected from each division of W-a to W-d.

Figure 25:
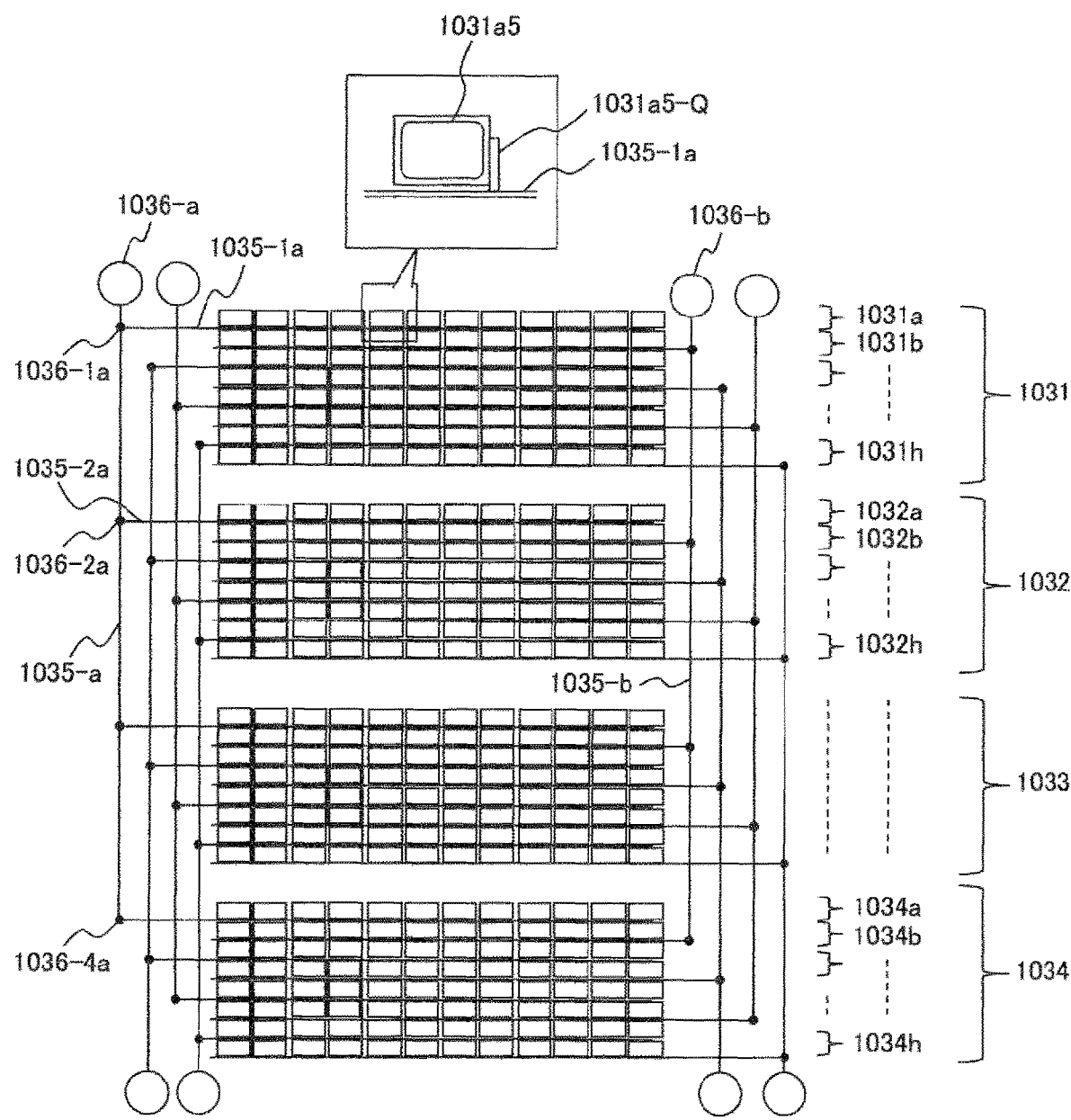
FIG. 25 is a block diagram showing an internal circuit configuration of the photoelectric conversion unit according to the sixth embodiment of the present invention.

In FIG. 25, an internal circuit of the photoelectric conversion unit 103-5 will be described. Although photoelectric conversion means for outputting the total current outputs corresponding to the four compartments W-a to W-d shown in FIG. 23 has been described in FIG. 24, an example in which the defect is extended to eight divisions will be described in FIG. 25. Eight pixel groups are formed in each of the pixel blocks 1031 to 1034. For example, pixel groups 1031a to 1031h are formed in the pixel block 1031, and the pixel blocks 1032 to 1034 also have similar pixel groups.

A pixel 1031a5 which is obtained by enlarging a part of the pixel group 1031a is a fifth pixel of the pixel group 1031a, and an avalanche photodiode operating in a Geiger mode as the pixel 1031a5 is connected to a signal line 1035-1a via a quenching resistor 1031a5Q. Similarly, all the pixels belonging to the pixel group of 1031a are connected to the signal line 1035-1a, and a current flows through 1035-1a when a photon is incident on the pixel.

A reference sign 1035-2a is a signal line to which the pixels of the pixel group of 1032a are connected. As described above, signal lines to which the pixels belonging to the pixel group are electrically connected are provided in all the pixel groups. In order to detect the scattered light rays from the same position in the sample 1, the signal lines of 1031a, 1032a, . . . , and 1034a are connected to a signal line 1035-a at nodes 1036-1a to 1036-4a.

This signal line 1035a is connected by a pad of 1036-a and the signal is transmitted to the signal processing unit 105. Similarly, the pixels belonging to 1031b to 1034b are connected to a signal line of 1035-b, the signal line is connected by a pad of 1036-*b*, and the signal is transmitted to the signal processing unit 105.

The signal from the photoelectric conversion unit 103-5 transmitted to the signal processing unit 105 is processed by the signal processing unit 105, and thus, the defect is detected. Here, as for a method for detecting the defect by performing the processing in the signal processing unit 105, for example, positional information of the foreign substance or the defect on the sample 1 can be extracted by using a known method described in PTL 2.

According to the present embodiment, since the polarization state according to the scattered light from the defect desired to be detected can be set, even the weak scattered light from a minuter defect can be detected distinguishably as the scattered light from the sample 1.

Figure 26:
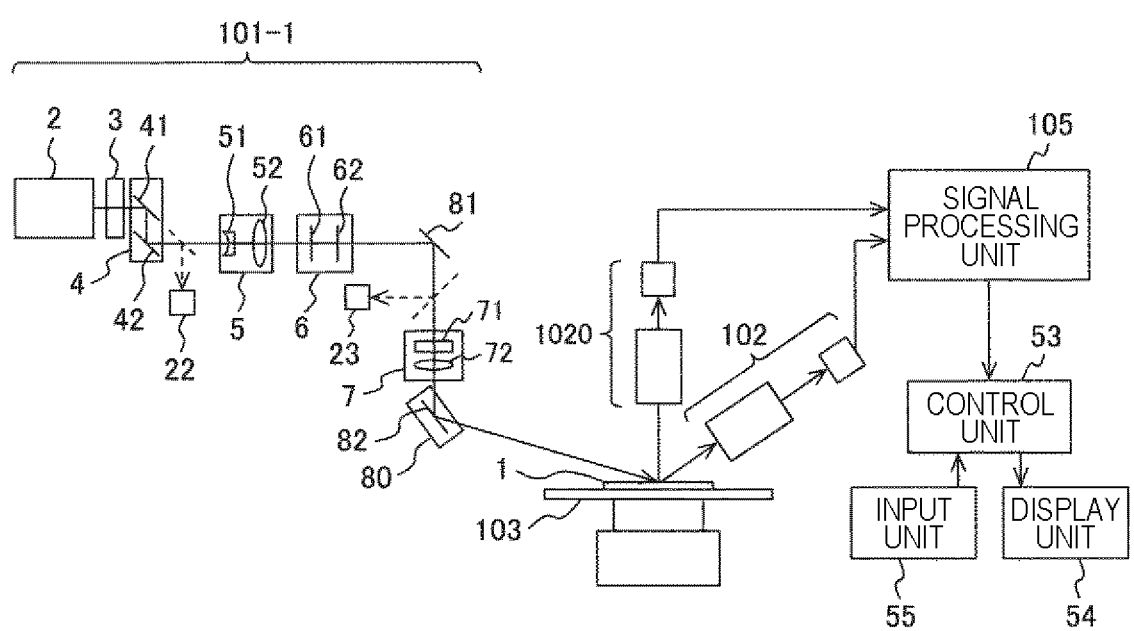
FIG. 26 is a block diagram showing a schematic configuration of a defect inspection device into which a detection optical system according to a sixth embodiment of the present invention is incorporated.

FIG. 26 shows a schematic configuration of a defect inspection device including the detection unit 102-4 according to the present embodiment and the detection unit 1020 for detecting the light scattered in the normal direction of the sample 1 described in the fifth embodiment. This configuration also corresponds to the configurations shown in FIGS. 8C and 8D.

With the configuration shown in FIG. 26, the light scattered in the vertical direction among the scattered light rays scattered from the sample 1 is detected by the detection unit 1020, and the light scattered diagonally is detected by a plurality of defection units 102-4 arranged around the detection unit 1020. Accordingly, it is possible to reliably detect the light scattered upward and obliquely from the minute foreign substance defect, and it is possible to extract the minuter foreign substance defect.

INDUSTRIAL APPLICABILITY

The present invention can be used in an inspection process of inspecting a foreign substance defect adhering to a surface of a semiconductor wafer in a manufacturing process of a semiconductor device.

REFERENCE SIGNS LIST

2 laser beam source
5 beam expander
6 polarized light control unit
7 illumination intensity distribution control unit
22 beam monitor
23 beam monitor
24 illumination intensity distribution monitor
53 control unit
54 display unit
55 input unit
101 illumination unit
102, 1020 detection unit
103 stage
103-1, 103-2, 103-3, 103-4, 103-5 photoelectric conversion unit
105 signal processing unit
106 optical module
107 polarized light transmission control unit
1021 objective lens
1022 birefringence phase difference control unit
1023 mirror
1024 relay lens
1026 polarization selection element
1027 imaging lens
1028*a*, 1028*b*, 1028*c* cylindrical lens array

The invention claimed is:

1. An inspection device comprising:
a sample holding unit that holds a sample to be inspected;
an illumination optical system that irradiates the sample held by the sample holding unit with light having a predetermined wavelength;
a detection optical system that includes a photoelectric conversion unit, collects reflected light or scattered light from the sample irradiated with the light, and guides the collected reflected or scattered light to the photoelectric conversion unit; and
a data processing unit that extracts positional information of a foreign substance or a defect on the sample by processing an output signal from the photoelectric conversion unit of the detection optical system that detects the reflected light or scattered light,
wherein
the detection optical system includes a polarized light transmission control unit that changes transmission characteristics according to polarization characteristics of the collected reflected light or scattered light, and
the polarized light transmission control unit includes
a birefringence phase difference control unit comprising first and second substances arranged to form a plurality of interleaved layers configured to cause a predetermined phase difference due to birefringence between a fast phase axis and a slow phase axis of the reflected light or scattered light according to the polarization characteristics of the reflected light or scattered light collected by the detection optical system, wherein the first and second substances have different refractive indices with respect to each other, and each of the first and second substances is constructed to have a first pitch in a direction of the fast phase axis that is narrower than the predetermined wavelength, and a second pitch in a direction of the slow phase axis that is longer than the predetermined wavelength; and
a polarized light transmission unit that selectively transmits light according to a polarization direction of output light of the birefringence phase difference control unit.

2. The inspection device according to claim 1, wherein a phase difference controlled by the birefringence phase difference control unit is a non-integer multiple of 90 degrees.

3. The inspection device according to claim 1,
wherein the the first pitch is constituted by a narrow pitch pattern which is shorter than a wavelength of the reflected light or scattered light collected by the detection optical system in a predetermined direction in a plane orthogonal to an optical axis of the detection optical system and the second pitch is longer than the wavelength of the reflected light or scattered light collected by the detection optical system in a direction orthogonal to the predetermined direction, and the narrow pitch pattern is configured to cause the predetermined phase difference to be determined by a thickness in the same direction as the optical axis of the detection optical system.

4. The inspection device according to claim 3, wherein the birefringence phase difference control unit is divided into at least two or more regions in the plane orthogonal to the optical axis of the detection optical system, and the predetermined direction of the narrow pitch pattern is set to each divided region.

5. The inspection device according to claim 1, wherein the birefringence phase difference control unit includes two rotatable wave plates having birefringence characteristics in which a phase difference is a non-integer multiple of 180 degrees.

6. An inspection method comprising:
irradiating a sample held by a sample holding unit that holds a sample to be inspected with light having a predetermined wavelength from an illumination optical system;
collecting, by a detection optical system, reflected light or scattered light from the sample irradiated with the light by the illumination optical system, and detecting, by a photoelectric conversion unit, the collected reflected or scattered light; and
extracting positional information of a foreign substance or a defect on the sample by, by a data processing unit, processing an output signal of the photoelectric conversion unit that detects the reflected light or scattered light,
wherein the method further includes
causing, by a birefringence phase difference control unit comprising first and second substances arranged to form a plurality of interleaved layers, a predetermined phase difference due to birefringence between a fast phase axis and a slow phase axis of the reflected light or scattered light according to polarization characteristics of the reflected light or scattered light collected by the detection optical system, wherein the first and second substances have different refractive indices with respect to each other, and each of the first and second substances is constructed to have a first pitch in a direction of the fast phase axis that is narrower than the predetermined wavelength, and a second pitch in a direction of the slow phase axis that is longer than the predetermined wavelength;
transmitting, by a polarized light transmission unit, selectively light according to a polarization direction of light in which the predetermined phase difference is caused by the birefringence phase difference control unit; and
detecting, by the photoelectric conversion unit, the light selectively transmitted by the polarized light transmission unit.

7. The inspection method according to claim 6, wherein a phase difference controlled by the birefringence phase difference control unit is a non-integer multiple of 90 degrees.

8. The inspection method according to claim 6, wherein the predetermined phase difference is caused by a thickness in the same direction as the optical axis of the detection optical system of the birefringence phase difference control unit constituted by the first and second substances each having different refractive indexes in a narrow pitch pattern in which the first pitch is shorter than a wavelength of the reflected light or scattered light collected by the detection optical system in a predetermined direction in a plane orthogonal to an optical axis of the detection optical system and the second pitch is longer than the wavelength of the reflected light or scattered light collected by the detection optical system in a direction orthogonal to the predetermined direction.

9. The inspection method according to claim 8, wherein the predetermined direction of the narrow pitch pattern is set, by the birefringence phase difference control unit divided into at least two or more regions in the plane orthogonal to the optical axis of the detection optical system, to each divided region.

10. The inspection method according to claim 6, wherein the predetermined phase difference is caused by the birefringence phase difference control unit including two rotatable wave plates having birefringence characteristics in which a phase difference is a non-integer multiple of 180 degrees.

11. An optical module comprising:
an objective lens;
a polarized light transmission control unit that changes transmission characteristics according to polarization characteristics of light collected by the objective lens;
an imaging lens; and
a sensor,
wherein
the polarized light transmission control unit includes
a birefringence phase difference control unit comprising first and second substances arranged to form a plurality of interleaved layers configured to cause a predetermined phase difference due to birefringence between a fast phase axis and a slow phase axis of the reflected light or scattered light according to the polarization characteristics of the reflected light or scattered light collected by the objective lens, wherein the first and second substances have different refractive indices with respect to each other, and each of the first and second substances is constructed to have a first pitch in a direction of the fast phase axis that is narrower than the predetermined wavelength, and a second pitch in a direction of the slow phase axis that is longer than the predetermined wavelength, and
a polarized light transmission unit that selectively transmits output light of the birefringence phase difference control unit according to a polarization direction of the output light.

12. The optical module according to claim 11, wherein the predetermined phase difference is a non-integer multiple of 90 degrees.

13. The optical module according to claim 11,
wherein the the first pitch is constituted by a narrow pitch pattern which is shorter than a wavelength of the reflected light or scattered light collected by the detection optical system in a predetermined direction in a plane orthogonal to an optical axis of the detection optical system and the second pitch is longer than the wavelength of the reflected light or scattered light collected by the detection optical system in a direction orthogonal to the predetermined direction, and the narrow pitch pattern is configured to cause the predetermined phase difference to be determined by a thickness in the same direction as the optical axis of the detection optical system.

14. The optical module according to claim 13, wherein the birefringence phase difference control unit is divided into at least two or more regions in a plane orthogonal to the optical axis, and the predetermined direction of the narrow pitch pattern is set to each divided region.

15. The optical module according to claim 11, wherein the birefringence phase difference control unit includes two rotatable wave plates having birefringence characteristics in which a phase difference is a non-integer multiple of 180 degrees.

* * * * *